US012487826B2

(12) United States Patent
Brelot et al.

(10) Patent No.: US 12,487,826 B2
(45) Date of Patent: Dec. 2, 2025

(54) PROCESSING APPARATUS

(71) Applicant: Nordic Semiconductor ASA, Trondheim (NO)

(72) Inventors: Jean-Baptiste Brelot, Trondheim (NO); Torbjørn Viem Ness, Trondheim (NO); Frode Pedersen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 352 days.

(21) Appl. No.: 18/020,404

(22) PCT Filed: Aug. 10, 2021

(86) PCT No.: PCT/EP2021/072253
§ 371 (c)(1),
(2) Date: Feb. 8, 2023

(87) PCT Pub. No.: WO2022/034063
PCT Pub. Date: Feb. 17, 2022

(65) Prior Publication Data
US 2023/0315456 A1    Oct. 5, 2023

(30) Foreign Application Priority Data

Aug. 10, 2020 (GB) .................................... 2012418

(51) Int. Cl.
*G06F 9/30* (2018.01)
(52) U.S. Cl.
CPC ...... *G06F 9/30101* (2013.01); *G06F 9/30123* (2013.01)
(58) Field of Classification Search
CPC .......................... G06F 9/30101; G06F 9/30123
See application file for complete search history.

(56) References Cited

U.S. PATENT DOCUMENTS 7,260,815 B1 * 8/2007 Chen ................... G06F 9/45516
717/124
2005/0240936 A1    10/2005 Jones et al.
(Continued)

OTHER PUBLICATIONS

Anonymous, "Cortex-M4(F) Lazy Stacking and Context Switching," pp. 1-30, URL: https://developer.arm.com/documentation/dai0298/a?lang=en, Mar. 16, 2012, pp. 3-23.
(Continued)

*Primary Examiner* — Zachary K Huson
(74) *Attorney, Agent, or Firm* — Klarquist Sparkman, LLP

(57) ABSTRACT

A processing apparatus has a processor comprising a plurality of deferred-push processor registers and processor-register control circuitry. The processor-register control circuitry comprises a plurality of status registers, each status register corresponding to a different respective deferred-push register. The processor-register control circuitry is configured to: detect a write of a new value to a register of the deferred-push registers; and determine whether the status register for the deferred-push register has a first value, indicative of an unsaved status for the deferred-push register. The processor-control circuitry is configured, when the status register has the first value, to: read a current value from the deferred-push register before the writing of the new value to the deferred-push register completes; write the current value to a memory; and set the status register for the deferred-push register to a second value, indicative of a saved status for the deferred-push register.

20 Claims, 15 Drawing Sheets

(56) References Cited

U.S. PATENT DOCUMENTS

| | | | |
|---|---|---|---|
| 2014/0129751 A1* | 5/2014 | Cho | G06F 13/24 710/260 |
| 2020/0371803 A1* | 11/2020 | Anderson | G06F 9/30123 |

OTHER PUBLICATIONS

Coleman, "A Practical guide to ARM Cortex-M Exception Handling : Interrupt," pp. 1-24, URL: https://interrupt.memfault.com/blog/arm-cortex-m-exceptions-and-nvic, Sep. 4, 2019, pp. 11-14.

IPO Search Report under Section 17(5) for GB2012418.6, dated May 11, 2021, 4 pages.

International Search Report and Written Opinion of the International Searching Authority for PCT/EP2021/072253, mailed Oct. 19, 2021, 16 pages.

McCamant, "Csci 5980/8980 Manual and Automated Binary Reverse Engineering Slides 4: x86 Functions," URL: https://www-users.cs.umn.edu/~smccaman/courses/8980/spring2020/lectures/03-x86-funcs-data-8up.pdf, May 31, 2020, pp. 1-5.

\* cited by examiner

PROCESSING APPARATUS

CROSS REFERENCE TO RELATED APPLICATIONS

This is the U.S. National Stage of International Application No. PCT/EP2021/072253, filed Aug. 10, 2021, which was published in English under PCT Article 21(2), which in turn claims the benefit of Great Britain Application No. 2012418.6, filed Aug. 10, 2020.

BACKGROUND OF THE INVENTION

This invention relates to a processing apparatus.

A processor typically contains a set of processor registers (often referred to as a register file) for storing digital values, an arithmetic and logic unit (ALU) for performing arithmetic and logical operations on values stored in the processor registers, and a control unit for loading software instructions into the computation unit. It also has a bus interface for receiving software instructions into the processor and for reading and writing data values from the processor to other components such as a random-access memory (RAM) and peripherals. The processor will typically also have an interface for receiving hardware interrupt signals.

A normal instruction cycle involves fetching a next instruction into the processor from a memory address represented by a special processor register known as the program counter (PC). The processor then executes the instruction and updates the program counter so that the appropriate next instruction is fetched.

However, if an interrupt request is received by the processor, the processor must instead perform a context switch by saving (pushing) the current values of the program counter and certain processor registers (e.g. caller-saved registers) to a stack structure in RAM.

Some processors will do this stacking automatically—i.e. as a hardware action—before branching to an interrupt handler in order to service the interrupt. The interrupt handler can then freely use the saved processor register values during its execution. When the interrupt handler returns, the processor automatically reads (pops) the saved register values off the stack and writes them to the corresponding processor registers. The processor also sets the program counter so that software execution continues from the point at which the interrupt was received.

However, such saving of register values to RAM has a cost both in processor time (clock cycles) and bus load. It may therefore have a significant impact on the responsiveness or latency of the system.

Some processors seek to reduce the need to push register values to RAM by providing a second register file that can be used when switching context. However, such an approach increases the size and complexity of the processor, and does not support nested interrupts.

In other processors, the pushing of processors registers that must be restored after the interrupt is handled is implemented in software—i.e. by the processor executing instructions contained in a function prologue within the interrupt handler. However, this also increases latency due to the need to fetch and execute these instructions.

The present invention seeks to provide a new approach that can enable more efficient processor context switching.

SUMMARY OF THE INVENTION

From a first aspect, the invention provides a processing apparatus comprising a processor, wherein:

the processor comprises a plurality of deferred-push processor registers;

the processor comprises processor-register control circuitry;

the processor-register control circuitry comprises a plurality of status registers, each status register corresponding to a different respective deferred-push register;

the processor-register control circuitry is configured to detect a write of a new value to a register of the deferred-push registers;

the processor-register control circuitry is configured to determine whether the status register for the deferred-push register holds a first value, indicative of an unsaved status for the deferred-push register; and the processor-register control circuitry is configured, when the status register holds the first value, to: read a current value from the deferred-push register before the writing of the new value to the deferred-push register completes; write the current value to a memory; and set the status register for the deferred-push register to a second value, indicative of a saved status for the deferred-push register.

From a second aspect, the invention provides a method of operating a processing apparatus, wherein:

the processing apparatus comprises a processor;

the processor comprises a plurality of deferred-push processor registers; and the processor comprises a plurality of status registers, each status register corresponding to a different respective deferred-push register, the method comprising:

detecting a write of a new value to a register of the deferred-push registers;

determining that the status register for the deferred-push register holds a first value, indicative of an unsaved status for the deferred-push register;

reading a current value from the deferred-push register before the writing of the new value to the deferred-push register completes;

writing the current value to a memory; and setting the status register for the deferred-push register to a second value, indicative of a saved status for the deferred-push register.

Thus it will be seen that, in accordance with the invention, a processor is provided with additional status registers, associated with certain processor registers (referred to herein as "deferred-push" registers, for ease of reference), and circuitry that enables the processor to use the status registers to determine whether each of the deferred-push registers has, or has not, yet been pushed to the memory (e.g. to a RAM stack). The processor need not then push such registers to the stack immediately upon performing a context switch, but may instead delay doing so until such time as each respective register is actually written to within the new context. If one or more of these deferred-push registers is never changed in the new context, this mechanism allows the processor to avoid having to push these registers to the stack at all, thereby saving bus transactions and/or processor cycles.

This approach can therefore facilitate greater efficiency compared with the processor hardware naïvely pushing, immediately upon switching context, all of the processor registers that need to be restored on returning from an interrupt handler. It can also be more efficient than requiring a called routine (e.g. an interrupt handler) to push and pop these processor registers by means of software instructions, since it avoids the need to fetch and execute these instructions.

In some embodiments, the status registers are single-bit registers. They may be individual flip-flops. They may be flags within a multi-bit status register. The first and second values may be opposite logic levels—i.e. logic 1 and logic 0. The same first value may represent an unsaved status across all of the status registers.

The deferred-push processor registers may be caller-saved registers—i.e. registers that would not normally be pushed to a stack by software within a called function. They may be multi-bit registers—e.g. each being a 32 or 64 bit register. The processor may comprise further processor registers that are not deferred-push registers, such as callee-saved registers and special registers, that do not have corresponding status registers and to which the processor-register control circuitry is not arranged to detect writes.

The processor may comprise one of more hardware interrupt inputs for receiving hardware interrupt requests. The processor-register control circuitry may be configured to set all of the status registers to the first (unsaved) value in response to the processor receiving a hardware interrupt request.

The memory may be a random-access memory, such as SRAM. The processing apparatus may comprise the memory. It may comprise a bus connecting the processor to the memory. The processor may be configured to write the current value to a stack structure in the memory. The processor may comprise a stack pointer register which it may use to determine addresses to which to push and/or pop processor register values. In particular, it may use a stack-pointer value stored in the stack pointer register to determine a memory address to which to push a processor register that is not one of the plurality of deferred-push processor register. In some embodiments, the processor-register control circuitry may additionally use the stack pointer register to determine a memory address to which to push said current value of the deferred-push register (potentially indirectly), although this is not essential in all embodiments, as explained below.

The processor-register control circuitry may comprise a register, referred to herein as the context stack pointer or CSP, which is preferably sized to hold an address in the memory, e.g. within a stack structure in the memory, which may at times be a copy of a current value of the stack pointer. The processor-register control circuitry may be configured to use a context stack pointer value, stored in the context stack pointer register, to determine a memory address to which to push, or from which to pop, a deferred-push register.

In some embodiments, the processor-register control circuitry may store pushed deferred-push register values in a common stack structure with other pushed processor register values, while in other embodiments it may maintain a separate context stack for receiving pushed deferred-push register values that is distinct from a main stack used for receiving other pushed processor register values.

In a first set of embodiments, the processor may be configured to store deferred-push register values and other processor register values in a common stack structure. It may be configured to change the stack pointer (i.e. the value of the stack pointer register), in response to receiving a hardware interrupt request, by an amount (referred to herein as a stack frame size) corresponding to a portion of memory at least large enough to hold all of the deferred-push register values. It may change the stack pointer by an amount that is at least sufficient to store: all the deferred-push register values, a program counter value, the status registers associated with the deferred-push registers, and the context stack pointer. In this way, sufficient space can be reserved in the stack for receiving any of the deferred-push registers that later need to be pushed to it.

The processor-register control circuitry may be configured, in response to receiving a hardware interrupt request, to push the program counter and/or the status registers (e.g. by pushing a multi-bit status register comprising the status registers) and/or the context stack pointer, to addresses in the memory determined by a value stored in the stack pointer register. The processor-register control circuitry may be configured, after pushing the context stack pointer, to copy a value (i.e. the current stack pointer) from the stack pointer register to the context stack pointer register. The stack pointer may have been changed by the stack frame size prior to the copying. By pushing the status registers and the context stack pointer to the stack, the processing apparatus can support nested interrupts (e.g. where a higher-priority interrupts a lower-priority interrupt handler), potentially to any depth, limited only by the available stack space. The processor-register control circuitry may be configured to use the context stack pointer to determine an address to which to push a value of a deferred-push processor register. It may determine the address by applying an offset to a value in the context stack pointer register. The processor-register control circuitry may comprise hardwired logic for determining the address. Each of the deferred-push registers may be associated with a different respective constant offset. In this way, each deferred-push register has a respective reserved position within the reserved stack frame.

In a second set of embodiments, the processor may be configured to store deferred-push register values in a context stack that is distinct from a stack used to store values of one or more other processor registers. The context stack pointer register may be used to maintain the context stack, independently of the stack pointer register. The processor-register control circuitry may comprise a plurality of multi-bit position registers, each position register corresponding to a different respective deferred-push register. The processor-register control circuitry may be configured, when pushing a deferred-push register to an address in the memory, to store a value in the corresponding position register that encodes the address relative to a value of the context stack pointer register—e.g. as an offset from the address value in the CSP at the time the deferred-push register was pushed. In this way, it is not necessary for the deferred-push register to have fixed predetermined offsets, thereby avoiding the need to reserve a stack frame large enough to receive all the deferred-push registers, even if only a subset need to be pushed; instead, the pushed values can be packed more efficiently in the memory. The processor-register control circuitry may be configured to push a value of a deferred-push register to an address that depends on the number of deferred-push registers that have their associated status registers equal to the second (saved) value. A deferred-push register may be pushed to the next unoccupied address in the memory after the context stack pointer, in a predetermined direction (i.e. either incrementing or decrementing through the address space). In this way, the memory can be used more efficiently, by pushing deferred-push registers to consecutive (i.e. adjacent) memory addresses, rather than leaving gaps in a reserved stack frame. The address may also depend on the context stack pointer. In these embodiments, the context stack pointer may be wholly independent of the stack pointer (i.e. never set equal to the stack pointer), and may point to addresses in a separate region of memory from the addresses to which the stack pointer points—i.e. to a separate context stack, distinct from the main call stack. The processor-register control circuitry may push the program counter and/or the status registers and/or the context stack pointer to addresses in the memory determined by a value stored in the context stack pointer register, rather than in the stack pointer.

In some embodiments, the processor-register control circuitry is configured, in response to detecting a return from an interrupt handler routine, to determine whether the status registers for each of the deferred-push register holds the second value, indicative of a saved status for the deferred-push register. It may be configured, when the status register holds the second value, to: read a pushed value for the deferred-push register from the memory, and write the pushed value to the deferred-push register. By only restoring (popping) the deferred-push registers that actually had their contents changed by an interrupt handler routine, embodiments may further limit the number of processor cycles and/or bus transactions required when returning from an interrupt.

The processor-register control circuitry may be configured to support tail-chained interrupt processing—i.e. handling two or more interrupts in succession without returning to the process that was executing when the first interrupt request was received between handling the successive interrupts. The processor may be configured not to pop the pushed context stack pointer and register status values when returning from a first interrupt handler when a second interrupt is pending.

The processor-register control circuitry may detect a write to a deferred-push register in any appropriate way. It may, for example, be arranged to receive a multiplexer control signal output by an instruction decoder in the processor. It may use this control signal to detect a write to a deferred-push register.

The memory may store software for execution by the processor. The memory may store an interrupt vector table. The software may comprise one or more interrupt handlers which may be stored at addresses identified in the interrupt vector table. The processor may be configured to branch to one of the interrupt handlers in response to receiving a hardware interrupt request signal. The interrupt handler may, in some embodiments, be configured to push one or more further processor registers to the memory. It may comprise an instruction which changes a value in one or more of the deferred-push processor registers.

The processing apparatus may be an integrated-circuit device. It may be a system on chip (SoC).

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
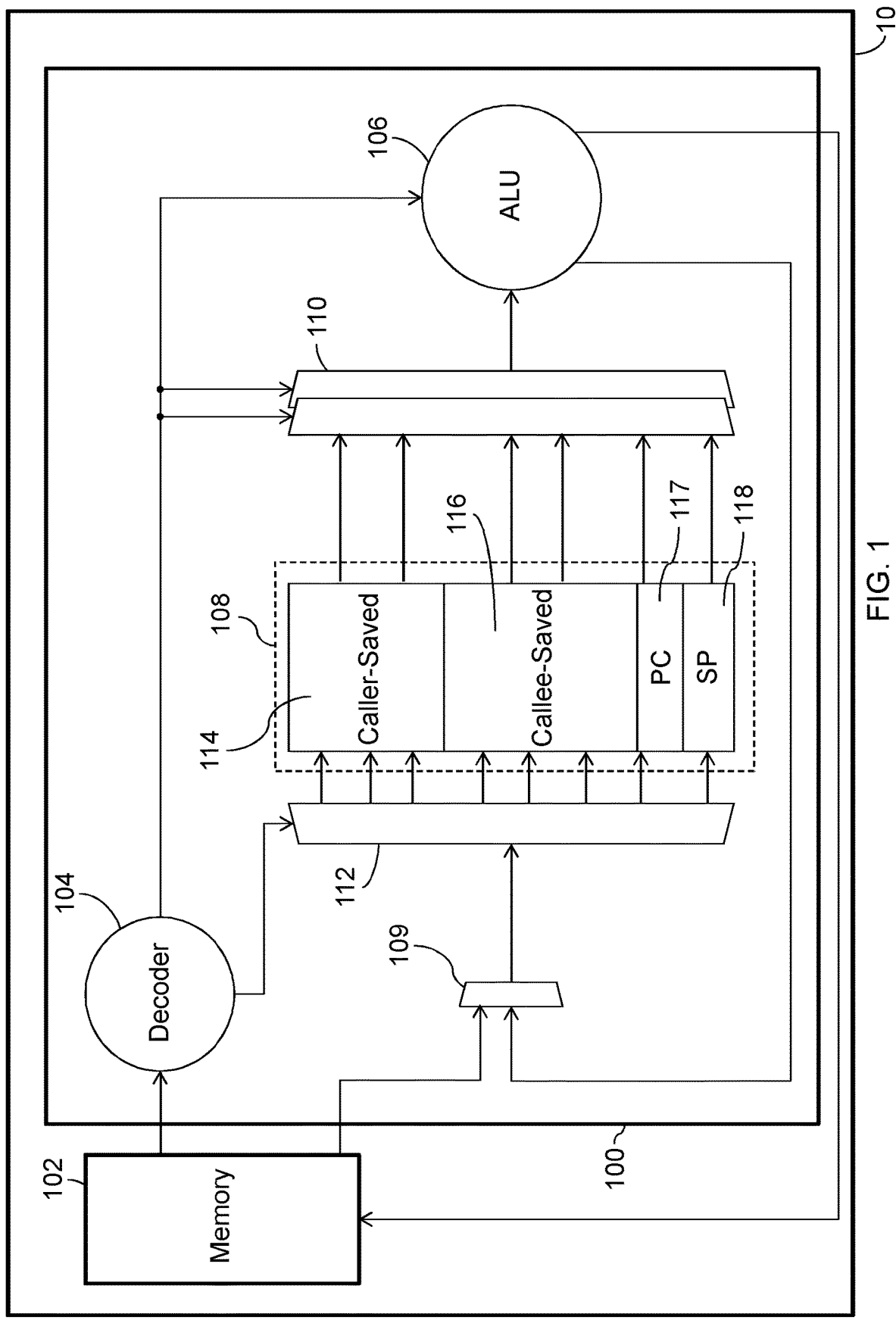
FIG. 1 is a schematic diagram of a conventional system on chip (SoC)

FIG. 1 shows, for reference purposes, a schematic diagram of a conventional system on chip (SoC) 10 comprising a processor 100 coupled to a memory 102. The memory 102 may include SRAM, connected to the processor 100 by a system bus. It may also include non-volatile memory, such as flash. The processor 100 may optionally include a memory cache (not shown). The SoC 10 may include further processors, peripherals, etc.

The processor 100 comprises an instruction decoder 104, an arithmetic logic unit (ALU) 106, a register file 108, a plurality of multiplexers 109-110, and a demultiplexer 112. The register file 108 comprises a plurality (e.g. eight) of caller-saved processor registers 114, a plurality of callee-saved processor registers 116, a Program Counter (PC) register 117, and a Stack Pointer (SP) register 118. The register file 108 also contains other standard processor registers (omitted from FIG. 1 for simplicity), such as a status register and a link register. The Program Counter (PC) register 117 contains the address of the instruction currently being carried out by the processor 100. Each register within the register file 108 comprises a number of flip-flops, e.g. thirty-two, used to store values required by the processor 100 during execution of an instruction.

The caller-saved registers 114 are used to hold temporary values. In contrast to the callee-saved register 116, a called function is not required to save these values on entry and to restore them before returning. Instead, if a calling function requires these registers 114 to be preserved, the calling function is responsible for storing their values in the memory 102. The callee-saved registers 116 are used to hold long-term values that should be preserved across function calls, with the storage and restoring of these values in the memory 102 being controlled by the routine being called (i.e. the callee). Under normal operating conditions, the ALU 106 writes to and reads from registers within the register file 108 in order to execute instructions. In order to write to a register, the ALU 106 outputs a value to the multiplexer 109, which in turn outputs the value to the demultiplexer 112. The instruction decoder 104 outputs the desired write location (i.e. the desired register) to the demultiplexer 112, enabling the demultiplexer 112 to direct the value to the desired register within the register file 108. In order to read data from a register, data is output from the desired register to the multiplexer 110. The instruction decoder 104 outputs the desired read location (i.e. the desired register) to the multiplexer 110, enabling the multiplexer to connect a desired register as an input to the ALU 106. All calculations using the values stored in the register file 108 are performed within the ALU 106.

In order to execute instructions, the ALU 106 transmits an instruction-fetch bus request to the memory 102 containing an address at which the next desired instruction is stored (corresponding to the PC). The memory 102 then outputs the instruction stored at that address to the decoder 104, which in turn decodes the instruction in order to determine the instruction to be executed by the ALU 106.

The processor 100 is also able to write to and read data values from the memory 102. In order to write a value stored in a register within the register file 108 to the memory 102, the value stored within the register is read by the ALU 106 as described previously. The value is then output by the processor 100 to the memory 102, along with an address pointing to a location in which to store the value. In order to read a value stored in the memory 102 and store it in a register, the processor 100 transmits a read request (containing the address of the desired read location) to the memory 102. The memory then, in turn, transmits the value stored at the desired address to the multiplexer 109, which outputs the value to the demultiplexer 112. As described previously, the decoder 104 controls the demultiplexer 112 to set which register the value output by the multiplexer 109 should be stored in.

During execution of an instruction, it is possible for the processor 100 to receive a hardware interrupt request, e.g. from a peripheral. An interrupt request tells the processor 100 to pause execution of the current routine in order execute a different, more urgent set of instructions, before returning back to the same state of executing the original routine once the interrupt handler has completed.

After software has been loaded into the memory 102, the memory 102 will contain an interrupt vector table (IVT). This comprises a data structure that associates a list of interrupt requests with a list of interrupt handlers. When an interrupt request is received by the processor 100, the vector table is used by the processor 100 to determine the address of the associated interrupt handler (i.e. the instructions required to execute the interrupt) in order to allow the processor 100 to execute the interrupt handler instructions.

In order to be able to resume the original routine after handling an interrupt, the processor 100 needs to restore the values in the caller-saved registers 114 to the same state they were in immediately before executing the instruction handler. During execution of an instruction handler, the caller-saved registers (e.g. registers R0-R3 in a 32-bit Arm™ processors) are allowed to be overwritten, so if the data values stored within them are not stored elsewhere then the processor 100 is unable to resume execution of the original instruction from the point that was reached before handling the interrupt. In contrast to routine function calls, a hardware interrupt may occur at any time, without any warning being given to the routine that is currently executing. The software cannot therefore execute instructions to save the caller-saved registers 114 to the memory 102, as it can do before invoking a routine function call.

Thus, upon receiving an interrupt request, the processor 100 automatically stores all data contained within the caller-saved registers 114 in a stack in the memory 102. The 'stack' is a first-in-last-out data structure. Used in conjunction with the stack is the Stack Pointer (SP) which records the address of the most recent item added to the stack; it is stored in the Stack Pointer (SP) register 118. The Program Counter (PC) register 117, which contains the memory address of the instruction currently being executed by the processor 100, is also pushed to the stack. Other registers, such as a Program Status Register and Link Register may also be pushed. The values from the caller-saved registers 114 and the special registers that the processor 100 stores within the stack in the memory 102, are hereafter referred to as the 'context' data of the interrupt. The context data is conventionally of a fixed, predetermined size.

In order to store data in the stack, the processor 100 performs a 'push' operation, whereby the data is stored at the top of the stack (i.e. at the next available address as indicated by the stack pointer), and the SP is incremented to accommodate the size of the newly stored data. (Equivalently, the SP may be decremented, if the stack grows downwards in address space.) In order to read data from the stack, the processor 100 performs a 'pop' operation, whereby the data stored at the location pointed to by the SP is read from the memory and the SP is decremented by the size of the data being read.

After storing the context data, the processor 100 reads the address of the interrupt handler associated with the received interrupt request from the IVT stored in the memory and stores this in the Program Counter register 117. The processor 100 is subsequently able to begin execution of the interrupt handler. The interrupt handler may include a function prologue to push to the stack any of the callee-saved registers 116 (e.g. registers R4-R11 in a 32-bit Arm™ processor) that it is going to change, and a function epilogue to pop these values back to the appropriate registers 116 before returning.

Once execution of the interrupt handler is completed, the values held in the caller-saved registers 114 during execution of the interrupt handler are no longer needed by the processor 100. Thus, the processor 100 restores the context data from the stack to the caller-saved registers 114 by popping the context data from the stack and holding it in the caller-saved registers 114. This enables the processor 100 to resume execution of the interrupted function from the point at which the process 100 began execution of the interrupt handler.

If the processor 100 receives a second, higher priority interrupt request during execution of the first interrupt handler, the exact same process as described above is performed again—the processor 100 pushes all values held within the caller-saved registers 114 to the stack (the context data for the second interrupt) and begins execution of the second interrupt handler. Multiple nested interrupts can be handled in this way.

Figure 2:
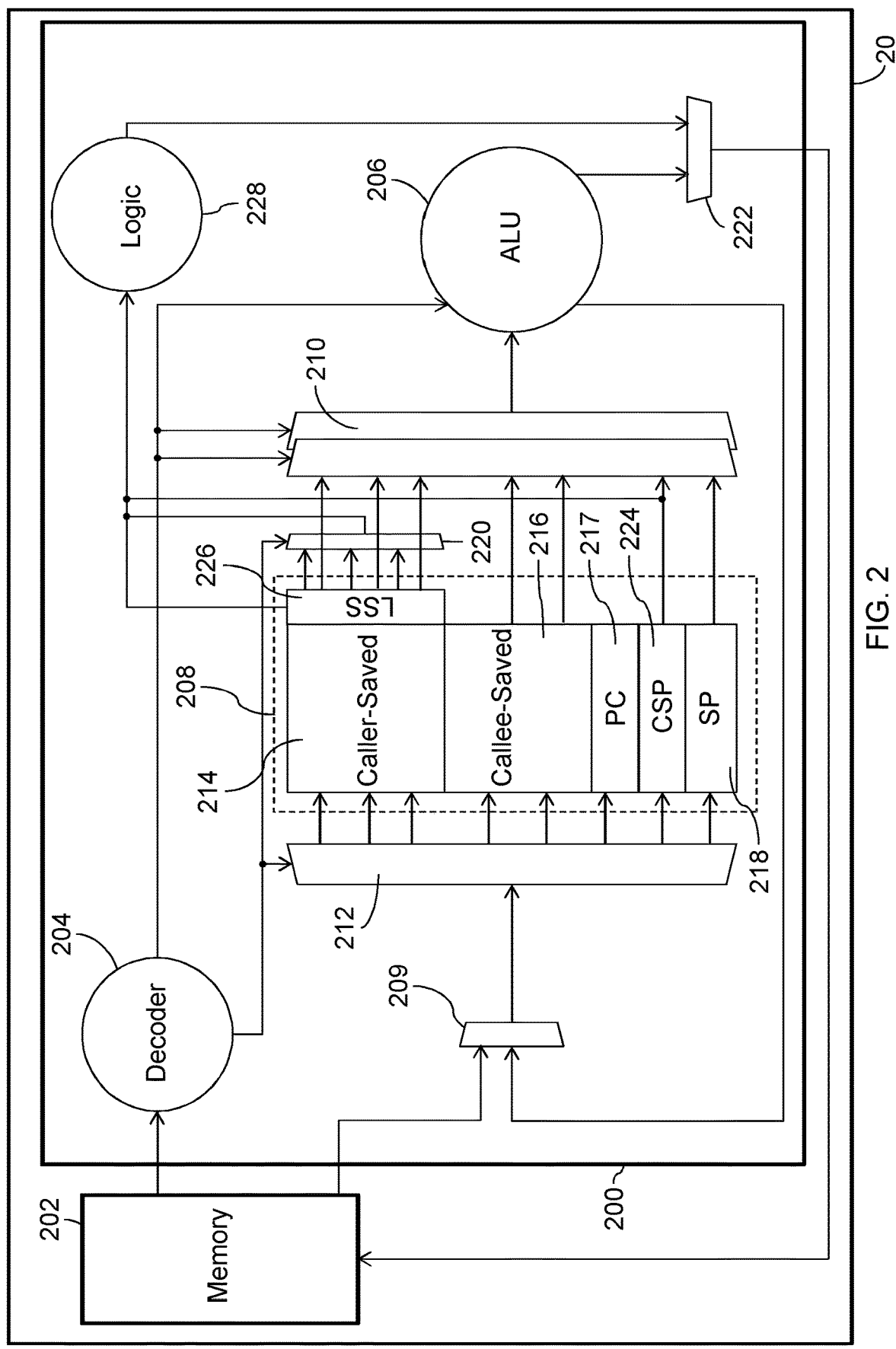
FIG. 2 is a schematic diagram of a system on chip (SoC) embodying the invention.

FIG. 2 shows a schematic diagram illustrating a system on chip (SoC) 20 embodying the present invention, comprising a processor 200 coupled to a memory 202. The memory 202 may include SRAM, connected to the processor 200 by a system bus. It may also include non-volatile memory, such as flash. The processor 200 may optionally include a memory cache (not shown). The SoC 20 may include further processors, peripherals, etc. (not shown in FIG. 2 for simplicity).

The components 204-218 are similar or the same as the corresponding components 104-118 shown in FIG. 1.

However, the processor 200 further comprises two multiplexers 220 and 222, as well as a logic unit 228. Additionally, the register file 208 further comprises a Context Stack Pointer (CSP) register 224 and a Local Stacking Status (LSS) register 226 which comprises a plurality of flip-flops (i.e. a plurality of bit flags) for storing a plurality of individual status bits, each associated with one of the caller-saved registers 214. The number of status bits is equal to the number of caller-saved registers 214 (e.g. eight). Each status bit is used to indicate whether the value held in the associated caller-saved register has been pushed (i.e. saved) to the stack since the latest hardware interrupt request was received by the processor 200, as will be described in further detail below. These additional elements together provide processor-register control circuitry, as disclosed above. The caller-saved registers 214 are examples of "deferred-push" registers, as disclosed above.

Although the CSP register 224 and LSS register 226 are shown in FIG. 2 as integrated into the main register file 208, it will be appreciated that they need not necessarily be physically adjacent the rest of the register file 208, but could be located anywhere on the chip 20.

When an interrupt is received by the processor 200, unlike the conventional processor 100, the processor 200 does not automatically push all values held within the caller-saved registers 214 (the context data) to the stack in the memory 202. Instead, the processor 200 pushes the values held in the Program Counter 217, Context Stack Pointer register 224 and Local Stacking Status registers 226, and simply reserves an amount of space required to store all values held in the caller-saved registers 114 by incrementing the stack pointer, stored in the Stack Pointer register 218, by a stack frame size equal to the amount of space that would be required to store the values held in all caller-saved registers 114, as well as the PC register 217, CSP register 224 and LSS register 226.

Once the PC, CSP and LSS have been stored in the stack in the memory 202, the processor 200 reads the interrupt handler address from the Interrupt Vector Table in the memory 202 as described above with reference to FIG. 1. Once the Stack Pointer has been incremented to reserve the stack frame size, the processor 200 sets the Context Stack Pointer (stored within CSP register 224) to the value of the Stack Pointer. The CSP is then used by the processor 200 to determine the location at which the context data for the interrupt handler is stored. If, during execution of the interrupt handler, the SP 218 is incremented, as is common during normal operation (as the processor 200 may need to push further items to the stack during execution), the CSP remains the same, pointing to the location of the context data for the interrupt handler.

Before beginning execution of the interrupt handler, the processor 200 sets the values of all status bits within the LSS to indicate that the values held in all of the caller-saved registers 214 have not been stored in the stack—i.e. to indicate an "unsaved" status.

During execution of the interrupt handler, the processor 200 may write to one or more of the caller-saved registers 214. In order to do this, the ALU 206 outputs the value to be written to a desired caller-saved register to the multiplexer 209, which in turn outputs the value to the demultiplexer 212. The instruction decoder 204 signals the desired write location (i.e. the desired caller-saved register) to the demultiplexer 212, enabling the demultiplexer 212 to direct the value to the desired caller-saved register 214. At the same time, the decoder 204 signals the same write location to the multiplexer 220. The multiplexer 220, when it receives the write location, couples the value stored currently in the register at that location to the logic unit 228.

At the same time, the corresponding single-bit status value stored within the LSS register 226 is accessed by the logic unit 228, which determines whether or not the caller-saved register being read through the multiplexer 220 has been saved to the stack, based on the value of the status bit associated with the register 214. If the status bit indicates that the register value has not been stored in the stack, the logic unit 228 outputs the value to the multiplexer 222 so that the register value is directed to the memory 202; it also indicates the address at which the value should be stored in the stack. If the status bit indicates that the register value has already been stored in the stack, the logic unit 228 does not output the value to the multiplexer 222.

The multiplexer 222 then, if the signal it receives from the logic unit 228 indicates to do so, outputs the register value along with the desired storage address to the stack within the memory 202. In this example, the desired storage address in the stack is given by the Context Stack Pointer, minus a fixed offset determined by which register the value was read from. Specifically, the storage location for the register value is given by:

$$\text{addr} = \text{CSP} - n_{reg} \quad (1),$$

wherein addr is the desired storage address in the stack, CSP is the Context Stack Pointer and $n_{reg}$ is the register number that the value was read from.

The logic unit 228 then changes the status bit associated with the register that was read from to indicate that the value held in the register immediately before being overwritten has now been stored in the stack. This prevents any further values being written to the register triggering the previous value to be stored in the stack.

For some processor designs, the writing of a new value to a caller-saved register 214 inherently allows sufficient time for the old value to be read out reliably, before being overwritten. However, in other processor designs, it may be necessary to introduce a delay element to delay the writing until the reading is completed.

After the interrupt handler returns, the logic 228 reads the LSS status bits again to determine which of the caller-saved registers 214 has been saved to the stack. It pops the values of the saved registers from the stack, using the current CSP register value and the relevant fixed offsets. The processor 200 then pops the stacked LSS, CSP and PC values so that execution returns to the original routine that was executing before the interrupt was received.

The operation of the system 20 shown in FIG. 2 will now be described in further detail with reference to FIGS. 3-10.

Figure 3:
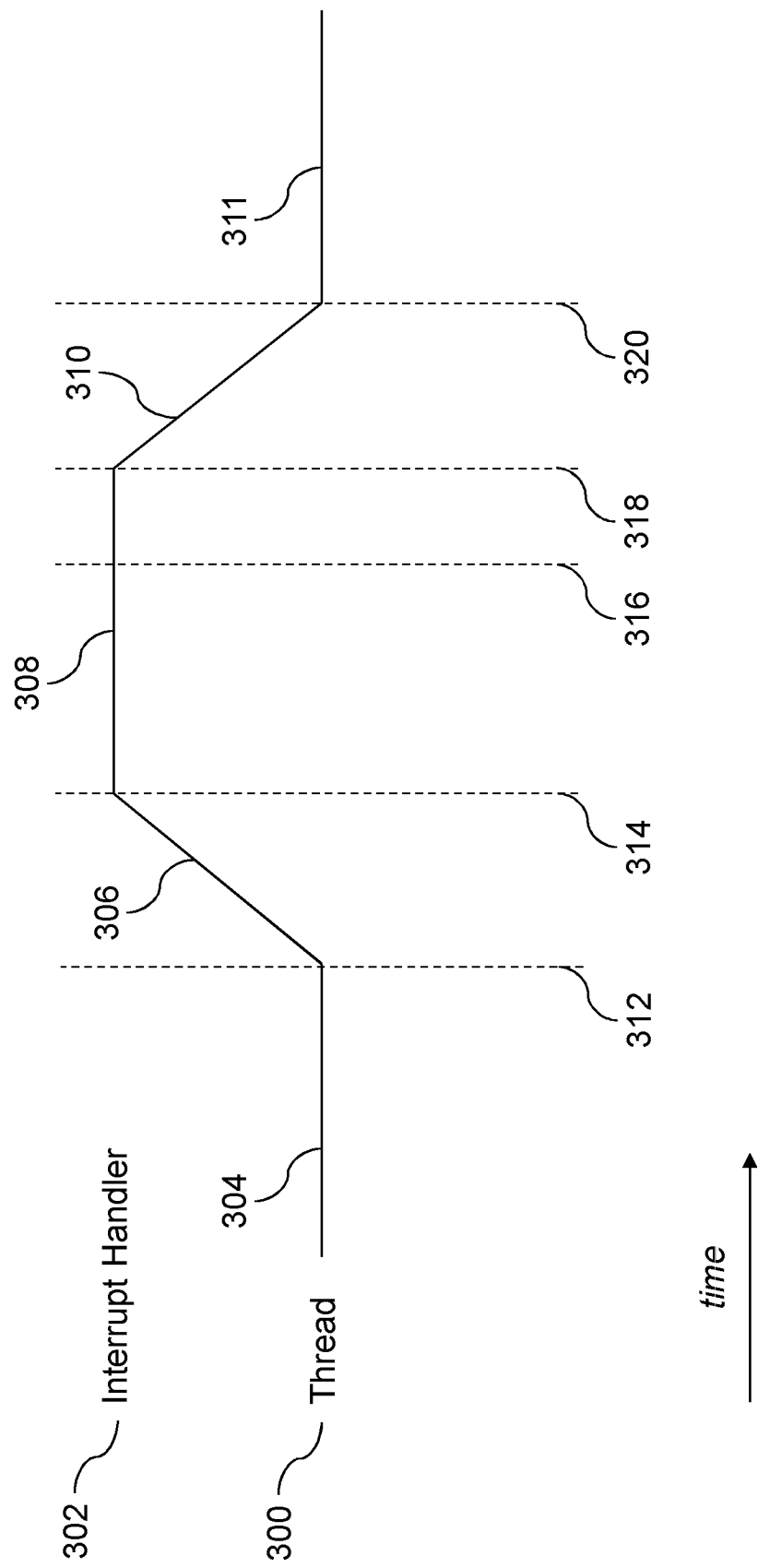
FIG. 3 is a time chart showing different stages as the SoC of FIG. 2 handles an interrupt request.

FIG. 3 shows a time chart illustrating a process, embodying the present invention, by which the processor 200 handles receiving an interrupt request whilst executing a thread 300.

Figure 4:
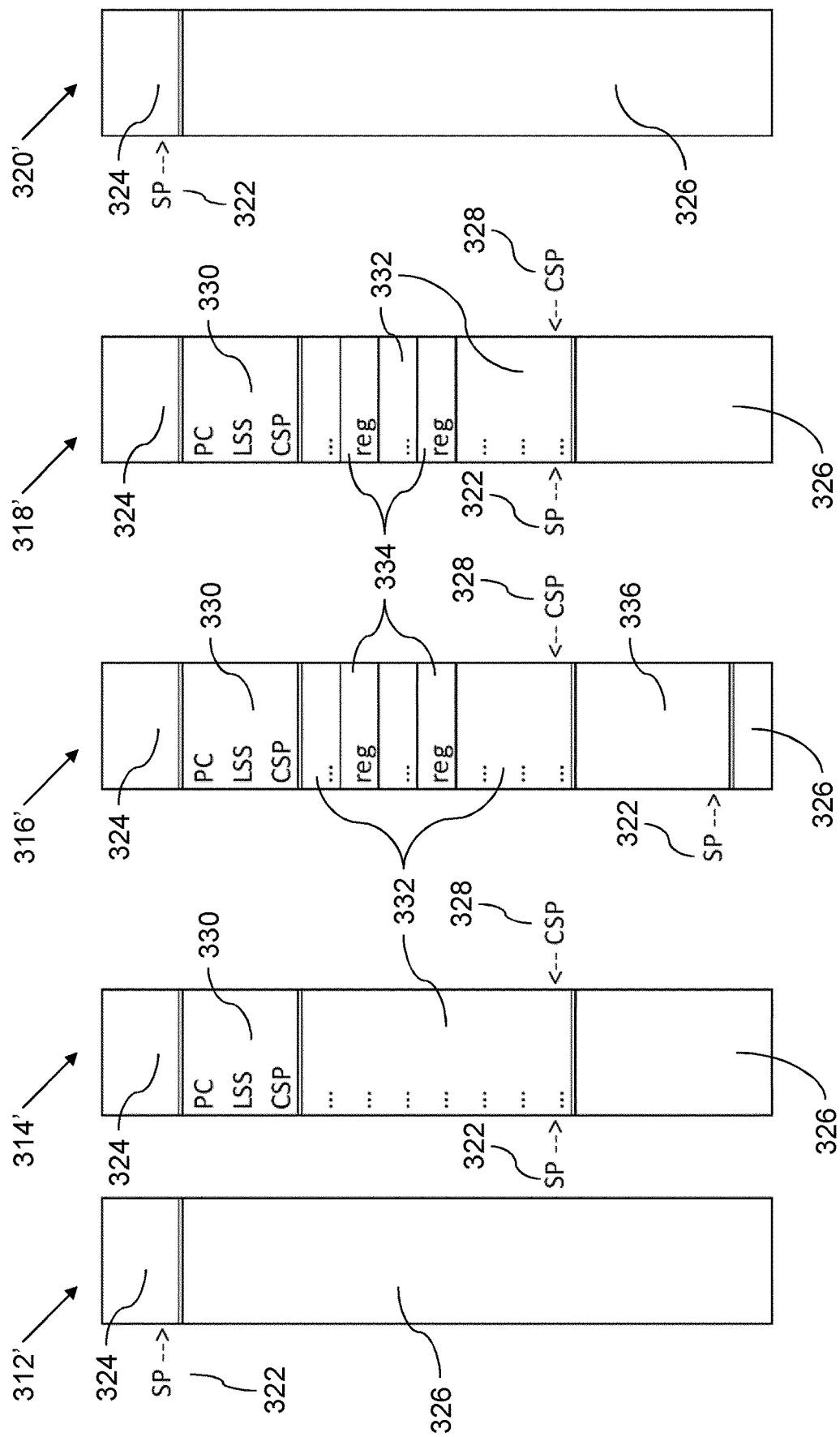
FIG. 4 is a schematic representation of the contents of the memory of the SoC of FIG. 2 at different stages of handling the interrupt request.

FIG. 4, which should be viewed in conjunction with FIG. 3, shows a number of schematic diagrams illustrating the state of the stack stored in the memory 202, at various stages during execution of the thread 300 and interrupt handler 302 by the processor 200. The stack is managed by the processor 200, and in this example has a fixed starting address (origin) within the memory 202.

Initially, at stage 304, the processor 200 executes the thread 300. At a time 312, the processor 200 receives a hardware interrupt request. Stack state 312' illustrates the stack at a time 312. Shown are the Stack Pointer (SP) 322, the used stack space 324 and the available stack space 326. The SP 322 comprises the address of the data most recently added (pushed) to the stack, which defines the limit of the used stack space 324, in which stack data required by the thread 300 and any other stack data needed for normal operation is stored. The size of the used stack space 324 is not limited to that shown in stack state 312', but may be any size. Shown below the SP 322 is the available stack space 326, which comprises a portion of available memory 202 that is available to be used for the stack. Whilst executing the thread 300, the SP 322 (and therefore size of used 324 and available 326 stack space) may change as the processor 200 pushes and pops data from the stack as required by the thread 300.

Under normal operation, when the processor 200 adds a data item to the stack, the data item is written to the next location after the address indicated by the SP 322, and the SP 322 is adjusted (downward in the case of the examples shown in FIGS. 4, 6-7 and 9-10, although it could equally be incremented or decremented) by the size of the data item written. The process of adding a data item to the stack is referred to herein as a 'push' operation, as outlined previously. When the processor 200 pops a data item from the stack, the location pointed to by the SP 322 is freed by adjusting the SP 322 (upward in the case of the examples shown in FIGS. 4, 6-7 and 9-10) by the size of the data item removed. The process of clearing a data item from the stack is referred to herein as a 'pop' operation, as outlined previously.

When the interrupt request is received at time 312, the processor 200 begins stage 306 where it transitions from executing the thread 300 to processing the interrupt request. During stage 306, the processor 200 pushes the Program Counter (PC), Local Storage Status (LSS) and Context Stack Pointer (CSP) associated with the thread 300 to the stack. The SP 322 is then further adjusted to reserve a portion of the stack equal to the stack frame size, and the CSP 328 is set to be equal to the SP 322. The status bits associated with the caller-saved registers are then all set to 'unsaved'. As used here, the term 'unsaved' is used to describe a state of a status bit, wherein the status bit is set to a value indicating that the value stored within the associated register has not yet been pushed to the stack since starting execution of the current procedure. Once the above steps have been undertaken, the processor 200 is able to begin execution of the interruption handler 302 at time 314. It will be understood that these steps are not limited to the order shown above, but may be executed in any reasonable order. In certain embodiments, the steps outlined above may be completed in three clock cycles, assuming ideal memory conditions.

Stack state 314' illustrates the state of the stack at time 314, after completing the steps listed above during stage 306. The SP 322 has been adjusted downward by ten entries (e.g. by ten 32-bit words), thereby reducing the size of the available stack space 326. Included in these ten entries are the PC, LSS and CSP (referred to as the 'link entries' 330) and the reserved entries 332. In this example, there are seven reserved entries 332, corresponding to the number of caller-saved registers, i.e. the stack frame size excluding the PC, LSS and CSP. However, the number of reserved entries 332 is not limited to seven, but may be any number, and therefore the stack frame size is also not limited to ten entries as shown in this example. In some examples, the number of reserved entries 332 is equal to eight entries, resulting in a stack frame size of eleven entries. The values stored in the link entries 330 and reserved entries 332 are referred to here as the context data for the interrupt handler 302, as outlined previously.

The CSP 328 is set to be equal to the SP 322. Note, the value in the CSP register 328 is not then the same as that stored in the link entries 330. The CSP stored in the link entries 330 comprises the address of the context data for the thread 300, and the CSP 328 comprises the address of the context data for interruption handler 302.

During execution of the interrupt handler 302, at stage 308, the processor 200 updates the values stored in two of the caller-saved registers. When the processor 200 updates the value stored in a caller-saved register, it simultaneously stores the previous value in the appropriate reserved entry 332, as outlined above. The processor 200 stores the previous value at the address designated by the CSP 328 less the offset designated by the specific register number (assuming the stack pointer increases in value as the stack grows), as outlined previously. When this happens, the status bit associated with the updated register is updated to 'saved'. As used here, the term 'saved' is used to describe the state of a status bit, wherein the status bit is set to a value indicating that the value held within the associated register has been pushed to the stack.

Also during execution of the interrupt handler 302, at stage 308, the processor 200 pushes and pops further data required by the interrupt handler 302 to the stack using normal stack management. Stack state 316' illustrates the stack at time 316, during execution of the interrupt handler 302. It can be seen that two caller-saved register values 334 have been stored in the stack, and that an additional portion of used stack space 336 contains values that have been pushed to the stack during execution of the interrupt handler 302, with the SP 322 being adjusted accordingly, thereby reducing the amount of available stack space 326.

At time 318, the processor 200 completes execution of the interrupt handler 302, and begins stage 310 where it transitions back to executing the thread 300. Stack state 318' illustrates the stack at time 318. As the execution of the interrupt handler 302 has finished, the processor 200 has popped the data stored in the additional used stack space 336 from the stack, and the SP 322 has been adjusted back to the location of the CSP 328 accordingly. The data that was stored in the additional used stack space 336 is no longer needed.

During stage 310, the processor 200 restores the context data in the stack to the caller-saved registers 214 in order to resume execution of the thread 300. In order to do this, the processor 200 uses the status bits within the LSS register 226 to determine which register values have been pushed to the stack by the processor 200 and therefore need to be restored, and which register values have not been pushed to the stack and therefore do not need to be restored. In accordance with the caller-saved register pushing process outlined with reference to FIG. 2, the registers that have not been pushed to the stack (their associated status bits indicating as such) have not been overwritten, and thus hold the same value as they did at time 312, before the processor 200 executed the interrupt handler 302. The processor 200 is able to ascertain the addresses at which the pushed register values 332 are located in the stack easily, as the address is given by the CSP and the specific register number, as shown in equation (1). The processor 200 therefore restores the pushed register values 332 to their associated caller-saved registers, before restoring the link entries 330 (PC, LSS and CSP) for the thread 300 and updating the stack pointer SP accordingly.

Once the context data has been restored, the processor 200 resumes execution of the thread 300 at time 320. Stack state 320' illustrates the stack at time 320. It can be seen that the stack state 320' is identical to the stack state 312', illustrating that the processor 200 resumes executing the thread 300 at the same point that it paused execution of the thread (time 312) to begin execution of the interrupt handler 302. The context data that was pushed to the stack in order to execute the interrupt handler 302 is no longer needed and the SP 322 has been adjusted accordingly. The processor 200 then continues execution of the thread 300 at stage 311.

Figure 5:
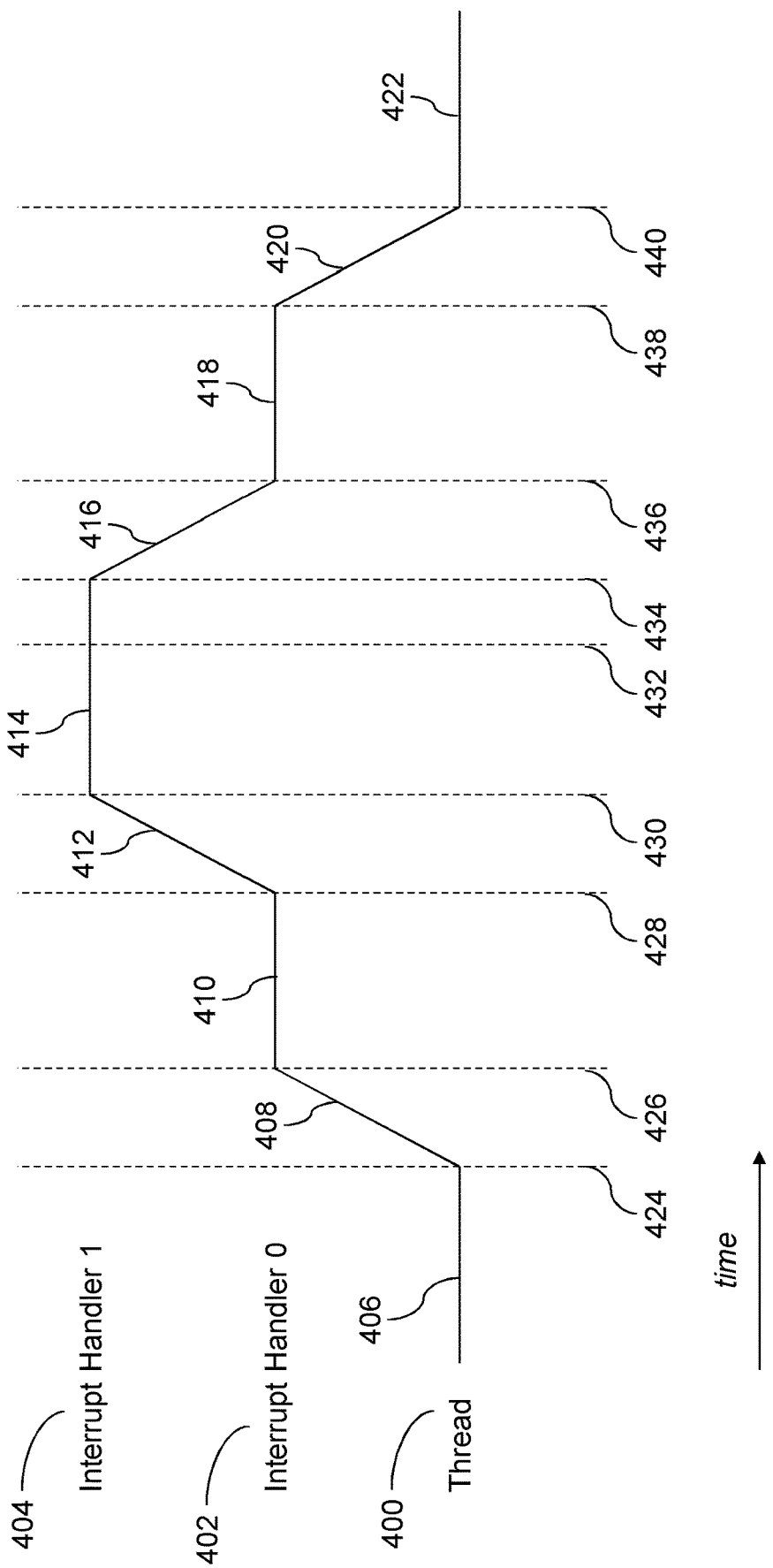
FIG. 5 is a time chart showing different stages as the SoC of FIG. 2 handles two interrupt requests with pre-emption.

FIG. 5 shows a schematic diagram illustrating the process, embodying the present invention, by which the processor 200 handles the execution of a first interrupt handler 402 being pre-empted (interrupted) by a second interrupt request, with respect to time.

Figure 6:
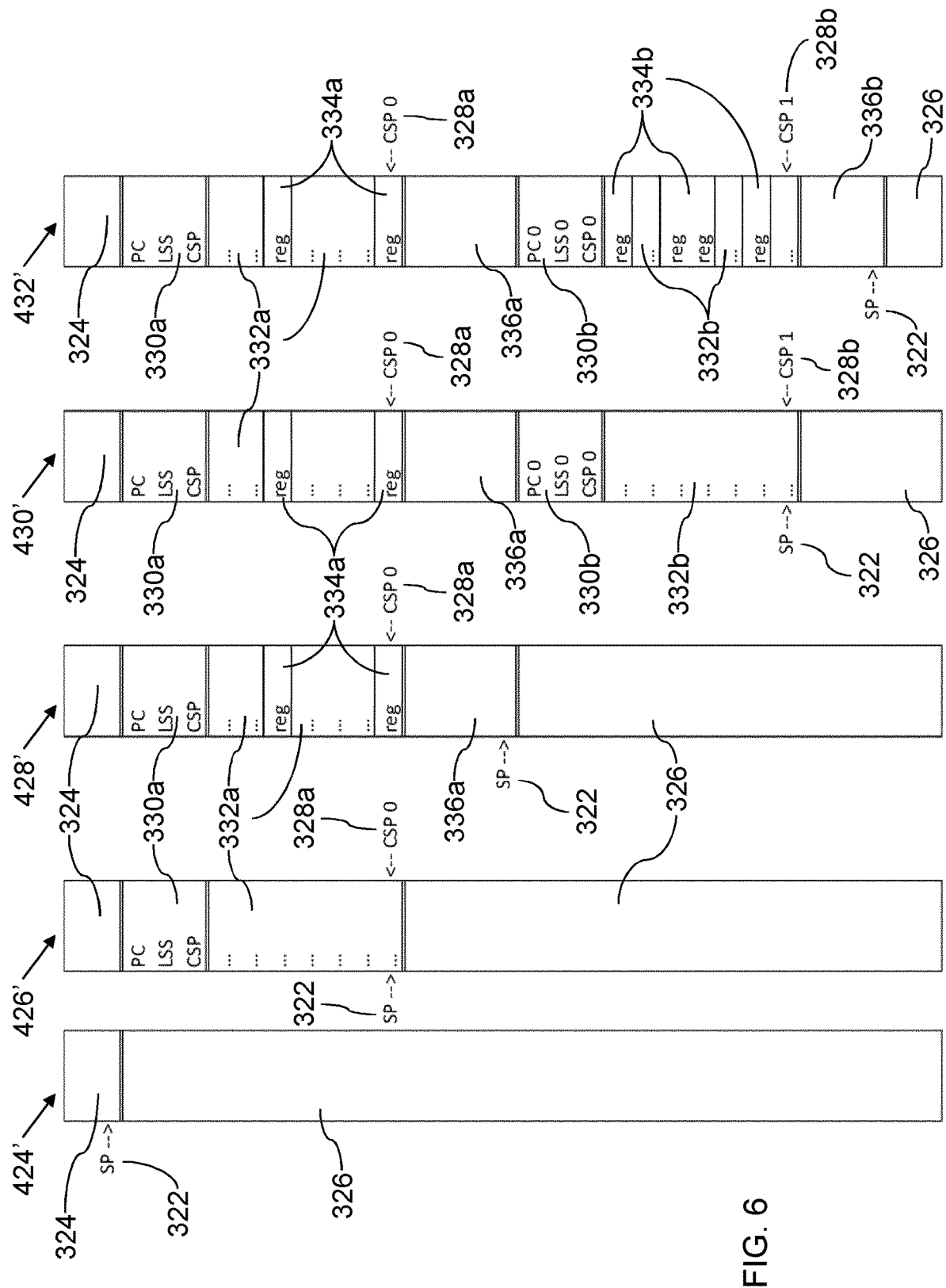
FIGS. 6 & 7 are schematic representations of the contents of the memory of the SoC of FIG. 2 at different stages of handling the interrupt requests with pre-emption.
Figure 7:
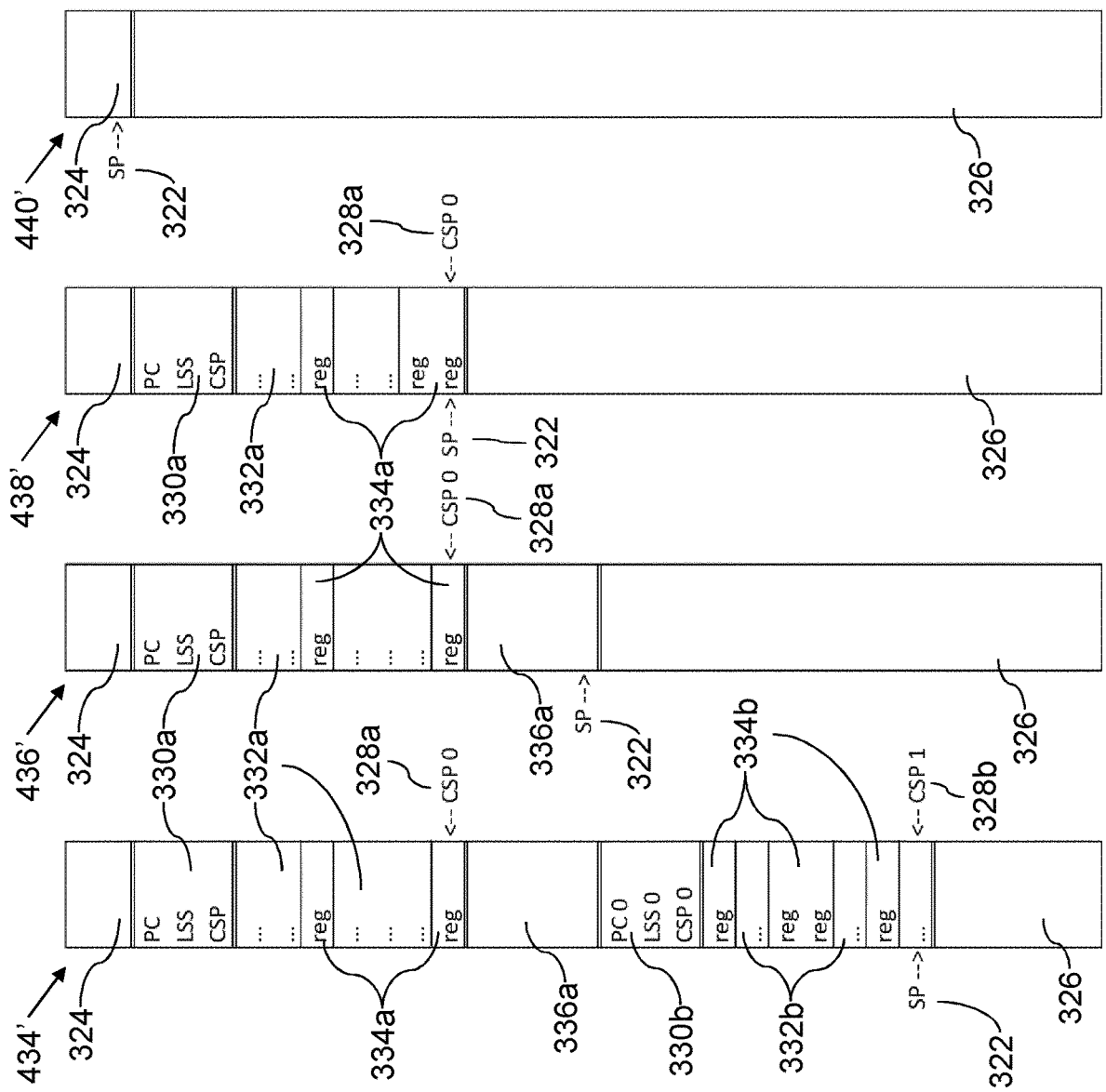

FIGS. 6 and 7, which should be viewed in conjunction with FIG. 5, show a number of schematic diagrams illustrating the state of the stack stored in the memory 202 at various stages during execution of the thread 400, first interrupt handler 402 and second interrupt handler 404 by the processor 200.

Initially, at stage 406, the processor 200 executes the thread 400. At a time 424, the processor 200 receives a first interrupt request. Stack state 424' illustrates the stack at time 424. Shown is the SP 322, above and including which is the used stack space 324 and below which is the available stack space 326. The size of the used stack space 324 (and therefore the size of the available stack space 326 and position of the SP 322) is not limited to that shown in stack state 424', but may be any value.

When the first interrupt request is received at time 424, the processor 200 begins stage 408 where it transitions from executing the thread 400 to processing the interrupt request. The steps taken by the processor 200 in order to transfer execution from the thread 400 to the first interrupt handler 402 are the same as those outlined previously with reference to FIGS. 3 and 4.

At time 426, the processor 200 begins execution of the first interrupt handler 402. Stack state 426' illustrates the stack at time 426. It can be seen from stack state 426' that the PC, LSS and CSP (link entries 330a) associated with the thread have been pushed to the stack, and the SP 322 has been adjusted to reserve the stack frame size, creating the reserved entries 332a. The values stored within the link entries 330a and reserved entries 332a comprise the context data for the first interrupt handler 402, and the CSP 328a has been adjusted to point to the context data for the first interrupt handler 402. The available stack space 326 has been decreased in size accordingly.

During stage 410, the processor 200 executes the first interrupt handler 402. At time 428, the processor 200 receives a second interrupt request. Stack state 428' illustrates the stack at time 428. During stage 410, the processor 200 has pushed the caller-saved register values 334a to the stack, storing the values at the appropriate locations within the stack as given by equation (1). At the same time, the registers in which the pushed values were held are updated to new values, and the status bits held in the LSS register 226 and associated with the pushed registers set to 'saved'. An additional portion of used stack space 336a has been pushed to the stack during execution of the first interrupt handler 402, with the SP 322 being adjusted accordingly, thereby reducing the amount of available stack space 326.

The second interrupt request received by the processor 200 at time 428 is of higher priority than the first interrupt, and therefore the processor 200 transitions from execution of the first interrupt handler 402 to the second interrupt handler 404, at stage 412. The steps taken by the processor 200 in order to transfer execution from the thread 400 to the first interrupt handler 402 are the same as those outlined previously with reference to FIGS. 3 and 4. Stack state 430' illustrates the stack at time 430, when the processor 200 has successfully transferred execution from the first interrupt handler 402 to the second interrupt handler 404.

It can be seen from stack state 430' that the processor 200 has pushed the link entries 330b associated with the first interrupt handler 302 to the stack, leaving the used stack space associated with the first interrupt handler 336a intact. The processor 200 has reserved the stack frame size, generating reserved entries 332b, and the SP 322 has been adjusted accordingly. The CSP 328b associated with the second interrupt handler 404 has been adjusted to be equal to the SP 322, and the available stack space 326 has been reduced in size accordingly. The values stored in the link entries 330b and reserved entries 332b comprise the context data for the second interrupt handler 404.

The processor 200 then executes the second interrupt handler 404 at stage 414. Stack state 432' illustrates the stack at time 432. It can be seen from stack state 432' that the processor 200 has pushed four caller-saved register values 334b to the stack, storing the values at the appropriate locations within the stack as given by equation (1). An additional portion of used stack space 336a has been pushed to the stack during execution of the second interrupt handler 404, with the SP 322 being adjusted accordingly, thereby reducing the amount of available stack space 326.

At time 434, the processor 200 ceases execution of the second interrupt handler 404, and begins transferring execution back to the first interrupt handler 402. Stack state 434' illustrates the stack at time 434. It can be seen from stack state 434' that the used stack space 336b associated with the second interrupt handler 404 has been popped from the stack, and the SP 322 has been adjusted accordingly.

During stage 416, the processor 200 restores the context data associated with the second interrupt handler 404 in the stack to the caller-saved registers 214 in order to resume execution of the first interrupt handler 402. In order to do this, the processor 200 uses the status bits within the LSS register 226 to determine which register values have been pushed to the stack by the processor 200 and therefore need to be restored, and which register values have not been pushed to the stack and therefore do not need to be restored. The processor 200 therefore restores the pushed register values 332b to their associated caller-saved registers, before restoring the link entries 330b (PC, LSS and CSP) for the first interrupt handler 402 and removing the context data for the second interrupt handler 404 from the stack, adjusting the stack pointer 322 accordingly.

Once the context data for the second interrupt handler 404 has been restored to the caller-saved registers 214, the processor 200 resumes execution of the first interrupt handler 402 at time 436. Stack state 436' illustrates the stack at time 436. It can be seen that the stack state 436' is identical to the stack state 428', illustrating that the processor 200 resumes executing the first interrupt handler 402 at the same point that it paused execution of the first interrupt handler 402 (time 428) to begin execution of the second interrupt handler 404. The context data that was pushed to the stack in order to execute the second interrupt handler 404 has been popped from the stack, and the SP 322 has been adjusted accordingly. The processor 200 then continues execution of the first interrupt handler 402 at stage 418.

At time 438, the processor 200 ceases execution of the first interrupt handler 402, and begins transferring execution back to the thread 400. Stack state 438' illustrates the stack at time 438. It can be seen from stack state 438' that the used stack space associated with the first interrupt handler 402 has been freed from the stack, and the SP 322 has been adjusted accordingly. Additionally, the processor 200 has pushed a third caller-saved register value 334a to the stack.

During stage 420, the processor 200 restores the context data associated with the first interrupt handler 402 in the stack to the caller-saved registers 214 in order to resume execution of the thread 400. In order to do this, the processor 200 uses the status bits within the LSS register 226 to determine which register values have been pushed to the stack by the processor 200 and therefore need to be restored, and which register values have not been pushed to the stack and therefore do not need to be restored. The processor 200 therefore restores the pushed register values 334b to their associated caller-saved registers, before restoring the link entries 330b (PC, LSS and CSP) and freeing the stack of the context data for the second interrupt handler 404 by adjusting the stack pointer 322 accordingly.

Once the context data for the first interrupt handler 404 has been restored to the caller-saved registers 214, the processor 200 resumes execution of the thread 400 at time 440. Stack state 440' illustrates the stack at time 440. It can be seen that the stack state 440' is identical to the stack state 424', illustrating that the processor 200 resumes executing the thread 400 at the same point that it paused execution of the thread 400 (time 424) to begin execution of the first interrupt handler 402. The context data that was pushed to the stack in order to execute the first interrupt handler 404 has been popped from the stack, and the SP 322 has been adjusted accordingly. The processor 200 then continues execution of the thread 400 at stage 422.

Figure 8:
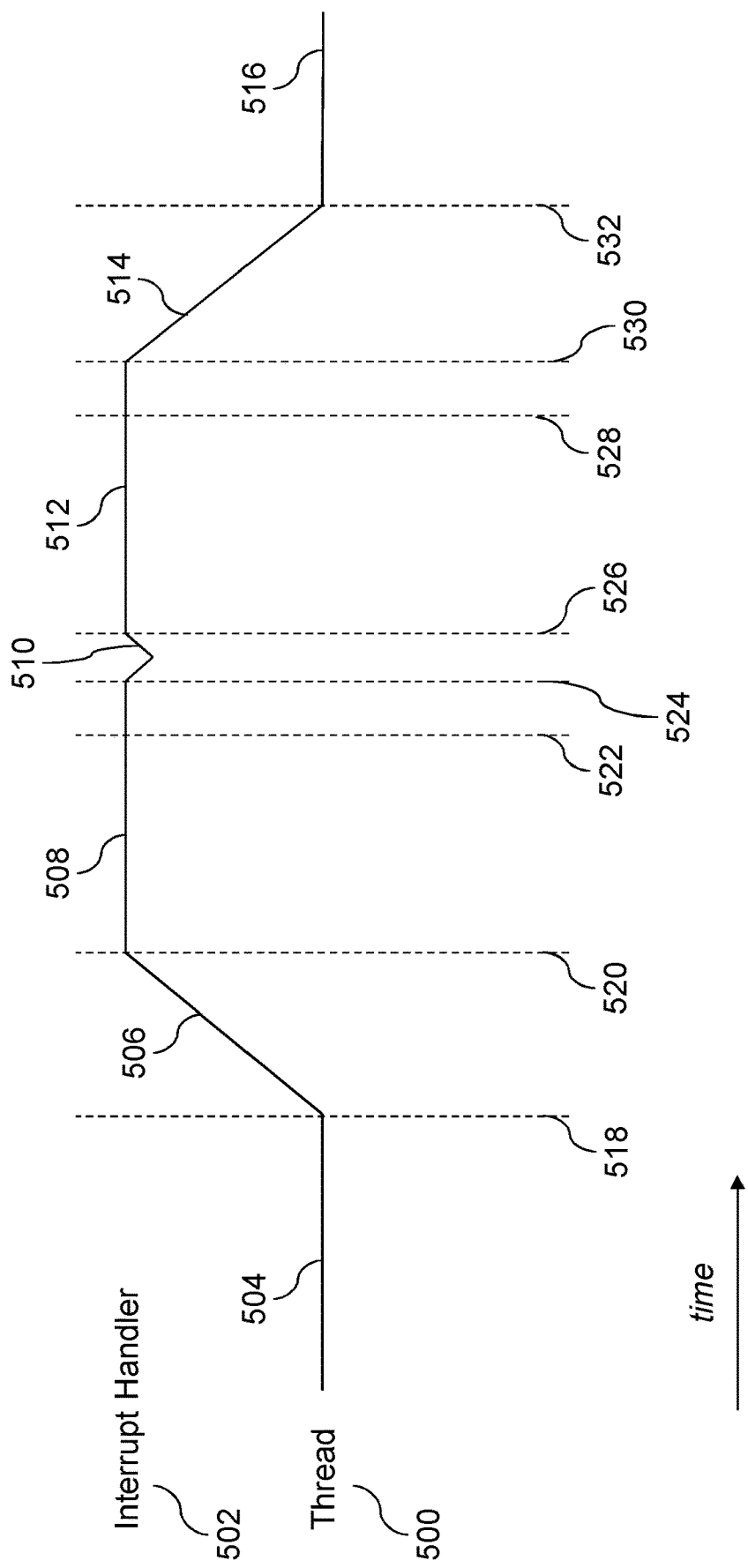
FIG. 8 is a time chart showing different stages as the SoC of FIG. 2 handles two interrupts with fast interrupt transition.

FIG. 8 shows a schematic diagram illustrating the process, embodying the present invention, by which the processor 200 is able to perform a fast interrupt transition (i.e. interrupt tail-chaining), when one interrupt is returning and another interrupt is pending, with respect to time.

Figure 9:
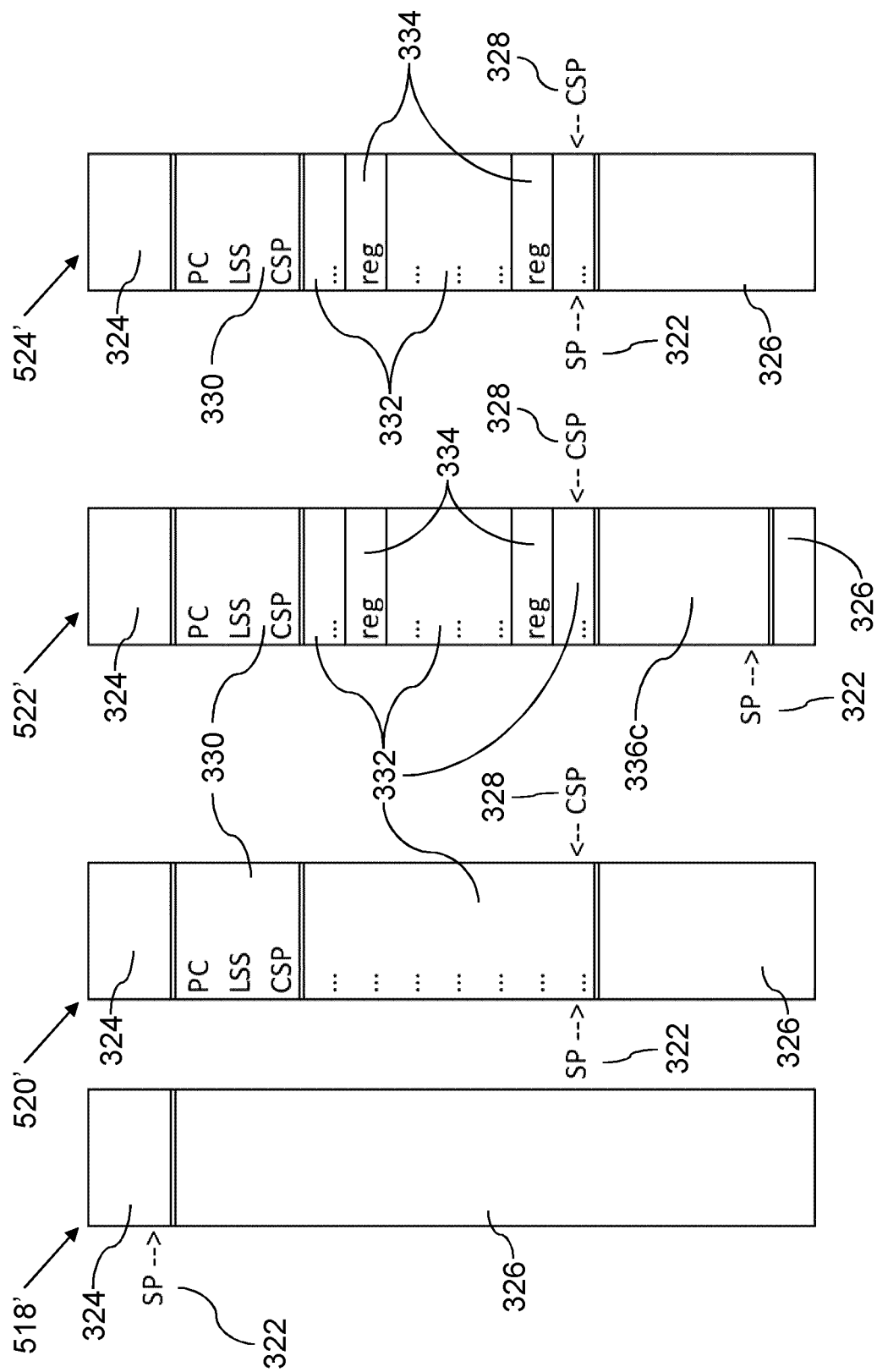
FIGS. 9 & 10 are schematic representations of the contents of the memory of the SoC of FIG. 2 at different stages of handling the interrupt requests with fast interrupt transition.
Figure 10:
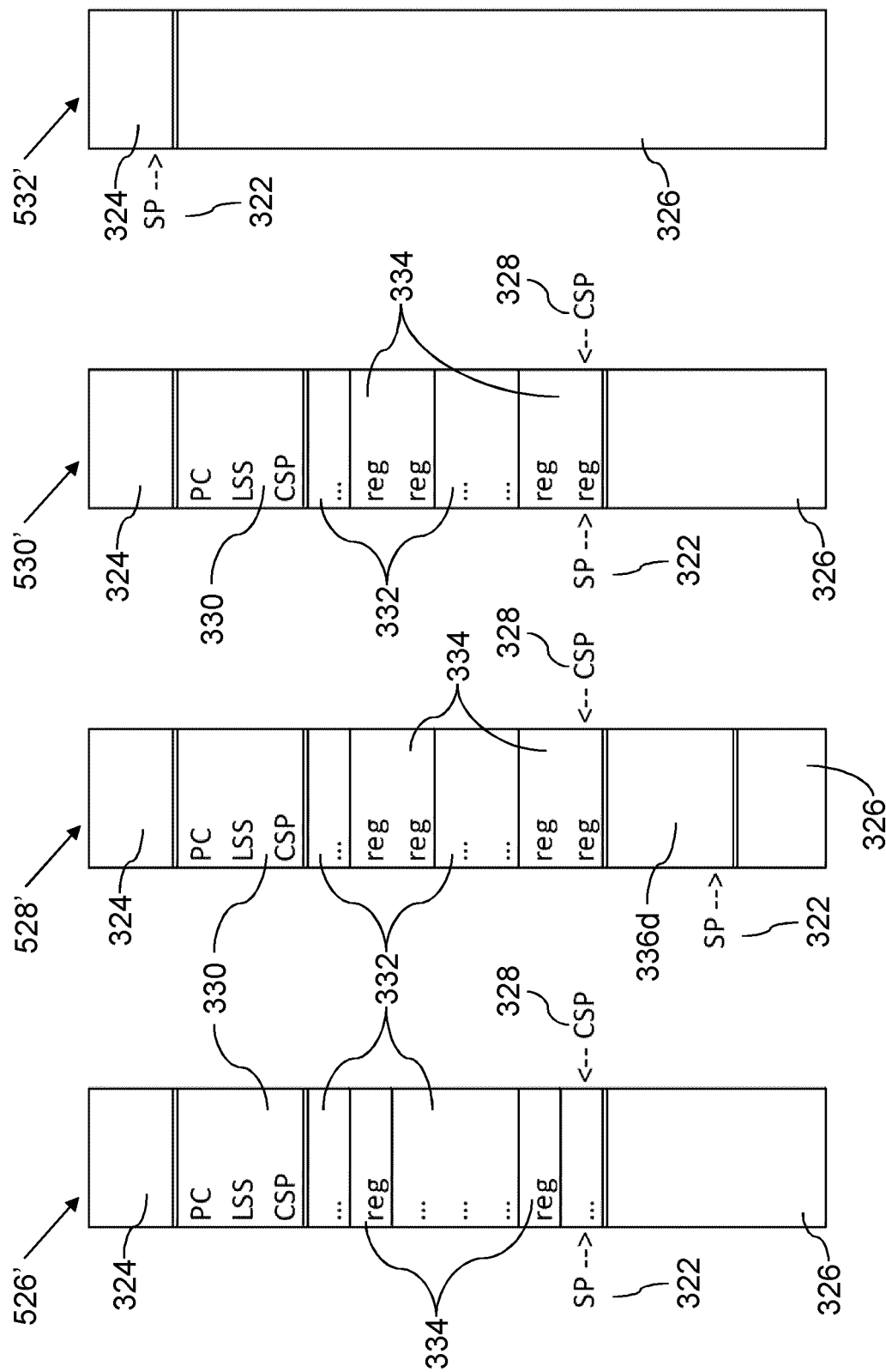

FIGS. 9 and 10, which should be viewed in conjunction with FIG. 8, show a number of schematic diagrams illustrating the state of the stack stored in the memory 202 at various stages during the execution of the thread 500 and interrupt handler 502 by the processor 200.

Initially, at stage 504, the processor 200 executes the thread 500. At a time 518, the processor 200 receives a first interrupt request. Stack state 518' illustrates the stack at time 518. Shown is the SP 322, above and including which is the used stack space 324 and below which is the available stack space 326. The size of the used stack space 324 (and therefore the size of the available stack space 326 and position of the SP 322) is not limited to that shown in stack state 518', but may be any value.

When the first interrupt request is received at time 518, the processor 200 begins stage 506 where it transitions from executing the thread 500 to processing the interrupt request. The steps taken by the processor 200 in order to transfer execution from the thread 500 to the interrupt handler 502 are the same as those outlined previously with reference to FIGS. 3 and 4.

At time 520, the processor 200 begins execution of the interrupt handler 502. Stack state 520' illustrates the stack at time 520. It can be seen from stack state 520' that the PC, LSS and CSP (link entries 330c) associated with the thread 500 have been pushed to the stack, and the SP 322 has been adjusted to reserve the stack frame size, creating the reserved entries 332. The values stored within the link entries 330c and reserved entries 332 comprise the context data for the interrupt handler 502, and the CSP 328 has been adjusted to point to the context data for the interrupt handler 502. The available stack space 326 has been decreased in size accordingly.

During stage 508, the processor 200 executes the interrupt handler 502. At time 522, the processor 200 receives a second interrupt request. Stack state 522' illustrates the stack at time 522. During stage 508, the processor 200 has pushed two caller-saved register values 334 to the stack, storing the values at the appropriate locations within the stack as given by equation (1). An additional portion of used stack space 336c has been pushed to the stack during execution of the interrupt handler 502, with the SP 322 being adjusted accordingly, thereby reducing the amount of available stack space 326.

The second interrupt request received by the processor 200 at time 428 is of the same or lower priority than the first interrupt request, and therefore the processor 200 continues executing the interrupt handler 502 for the first interrupt request until completion, at time 524, and the second interrupt request remains pending.

Stack state 524' illustrates the stack at time 524. At time 524, the processor 200 ceases execution of the interrupt handler 502 associated with the first interrupt request. It can be seen from stack state 524' that the used stack space 336c associated with the interrupt handler 502 associated with the first interrupt request has been freed from the stack, and the SP 322 has been adjusted accordingly.

If the processor 200 did not perform a fast interrupt transition as disclosed herein, the processor 200 would restore the context data associated with the interrupt handler 502 to the caller-saved registers 214 in order to execute the thread 500, before immediately performing the stack management and context data reserving steps required to transfer execution from the thread 500 to another interrupt handler 502 as outlined with reference to FIGS. 3 and 4.

Instead, in order to reduce the number of memory transactions, the processor 200 does not restore the context data to the caller-saved registers 214 during stage 510. The applicant has recognised that the context data for the interrupt handler 502 does not need to be restored to the caller-saved registers 214. Additionally, the CSP 328 and the LSS stored within the caller-saved registers 214 can be kept the same, as the context data required to restore execution of the thread 500 after execution of the interrupt handler 502 associated with the second interrupt request does not change. Thus, the process 200 simply fetches the new address value for the interrupt handler 502 associated with the second interrupt request from the Interrupt Vector Table in the memory 202, and updates the PC accordingly, while keeping the CSP 328, the LSS and the context data stored within the stack the same.

After performing the fast interrupt transition at stage 510, the processor 200 begins execution of the interrupt handler 502 associated with the second interrupt request at time 526. Stack state 526' illustrates the stack at time 526. It can be seen from stack state 526' that the stack state has not changed since time 524, as the context data stored in the stack has not been changed by the processor 200 during stage 510.

During stage 508, the processor 200 executes the interrupt handler 502 associated with the second interrupt request. Stack state 528' illustrates the stack at time 528. During stage 508, the processor 200 has pushed two additional caller-saved register values 334 to the stack, storing the values at the appropriate locations within the stack as given by equation (1). An additional portion of used stack space 336d has been pushed to the stack during execution of the interrupt handler 502 associated with the second interrupt request, with the SP 322 being adjusted accordingly, thereby reducing the amount of available stack space 326.

At time 530, the processor 200 ceases execution of the interrupt handler 502 associated with the second interrupt request, and begins transferring execution back to the thread 500. Stack state 530' illustrates the stack at time 530. It can be seen from stack state 530' that the used stack space associated with the interrupt handler 502 for the second interrupt request has been released from the stack, and the SP 322 has been adjusted accordingly.

During stage 514, the processor 200 restores the context data associated with the interrupt handler 502 in the stack to the caller-saved registers 214 in order to resume execution of the thread 500. In order to do this, the processor 200 uses the status bits within the LSS register 226 to determine which register values have been pushed to the stack by the processor 200 and therefore need to be restored, and which register values have not been pushed to the stack and therefore do not need to be restored. The processor 200 therefore restores the pushed register values 334 to their associated caller-saved registers, before restoring the link entries 330 (PC, LSS and CSP) and freeing the space occupied by the context data for the interrupt handler 502 by adjusting the stack pointer 322 accordingly.

Once the context data for the interrupt handler 502 has been restored to the caller-saved registers 214, the processor 200 resumes execution of the thread 500 at time 532. Stack state 532' illustrates the stack at time 532. It can be seen that the stack state 532' is identical to the stack state 518', illustrating that the processor 200 resumes executing the thread 500 at the same point that it paused execution of the thread 500 (time 518) to begin execution of the interrupt handler 502 associated with the first interrupt request. The context data that was pushed to the stack in order to execute the interrupt handler 502 has been popped from the stack, and the SP 322 has been adjusted accordingly. The processor 200 then continues execution of the thread 500 at stage 516.

Figure 11:
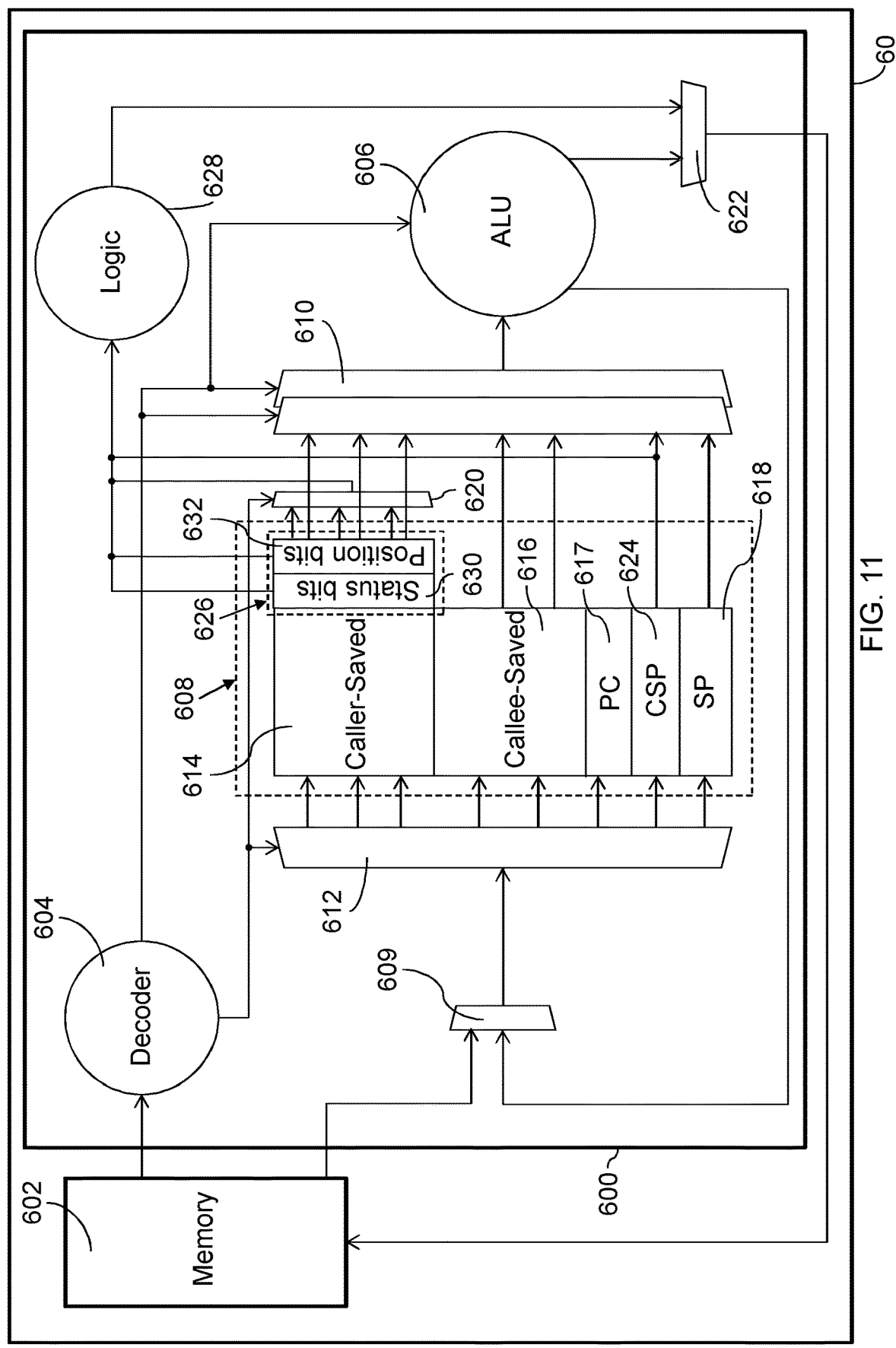
FIG. 11 is a schematic diagram of a second system on chip (SoC) embodying the invention, which uses register position bits to give increased memory space efficiency.

FIG. 11 shows a schematic diagram illustrating another system on chip 60 embodying the present invention, which is configured for particularly efficient memory usage. Instead of reserving a stack frame on the main stack, large enough to hold all of the deferred-push register values interrupt, this SoC 60 maintains a context stack that is distinct from the main stack. The main stack and context stack are described below as being in a common stack region of the memory, but they could alternatively be stored in entirely separate memory areas.

The SoC 60 comprises a processor 600 coupled to a memory 602. The processor 600 comprises the same components 604-624 as the components 204-224 of the processor 200 shown in FIG. 2, including eight caller-saved registers 614, with the only difference being the LSS register 626 and logic unit 628 when compared to the LSS register 226 and logic unit 228 shown in FIG. 2.

The LSS register 626 is a thirty-two bit register comprising two parts: eight status bits 630 and twenty-four position bits 632. The status bits 630 operate in exactly the same way as the status bits of the LSS register 226, as described with reference to FIG. 2. The operation of the processor 600, including the position bits 632, will be described further below with reference to FIGS. 12-15. Additionally, the logic circuit 628 is modified from the logic circuit 228 shown in FIG. 2, as it performs logic using the values held in the position bits 632 as well as the status bits 630, as explained below.

Figure 12:
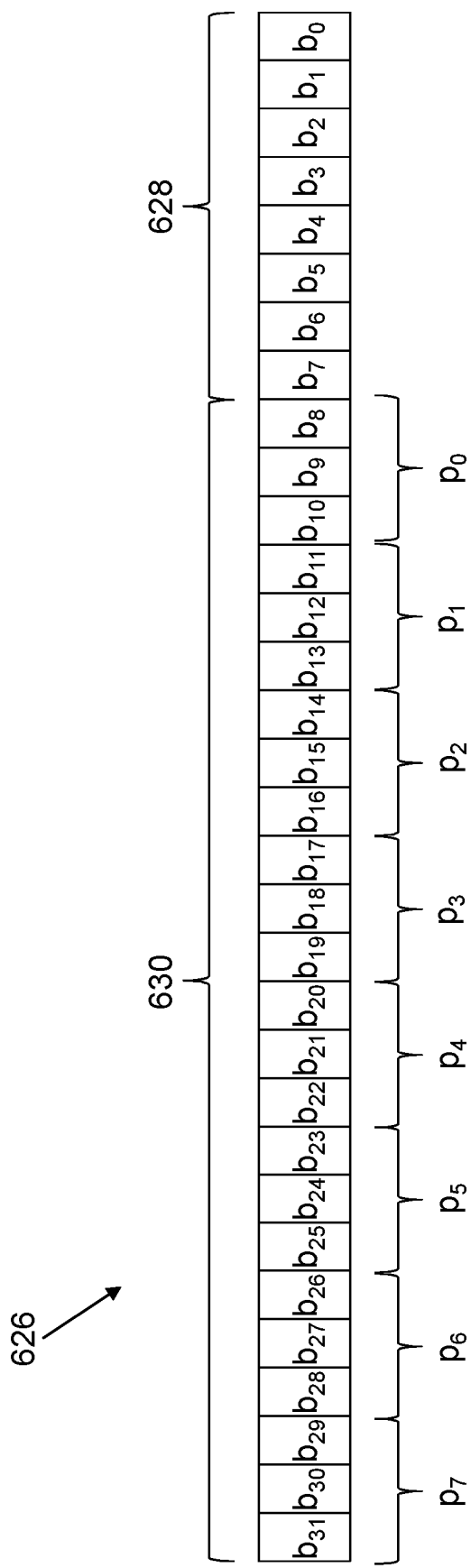
FIG. 12 is a schematic diagram of a Local Stacking Status register of the SoC of FIG. 11.

FIG. 12 shows a schematic diagram of the LSS register 626. In this example, the register file 608 comprises eight caller-saved registers 614. Shown are the status bits 630 which occupy bits $b_0$-$b_7$ and the position bits 632 which occupy bits $b_8$-$b_3$. The twenty-four position bits 632 are split into eight groups of three bits, with each group of three bits $p_0$-$p_7$ serving as a position register for a respective one of the caller-saved registers 614. Each position register is able to store a position value which encodes an address of the stack location for a respective one of the registers 614 as an offset from the value of the context stack pointer at the time the register was pushed to the context stack. Three bits provides the ability to assign eight unique location values. Of course, more bits may be provided if there are more than eight caller-saved registers.

Figure 13:
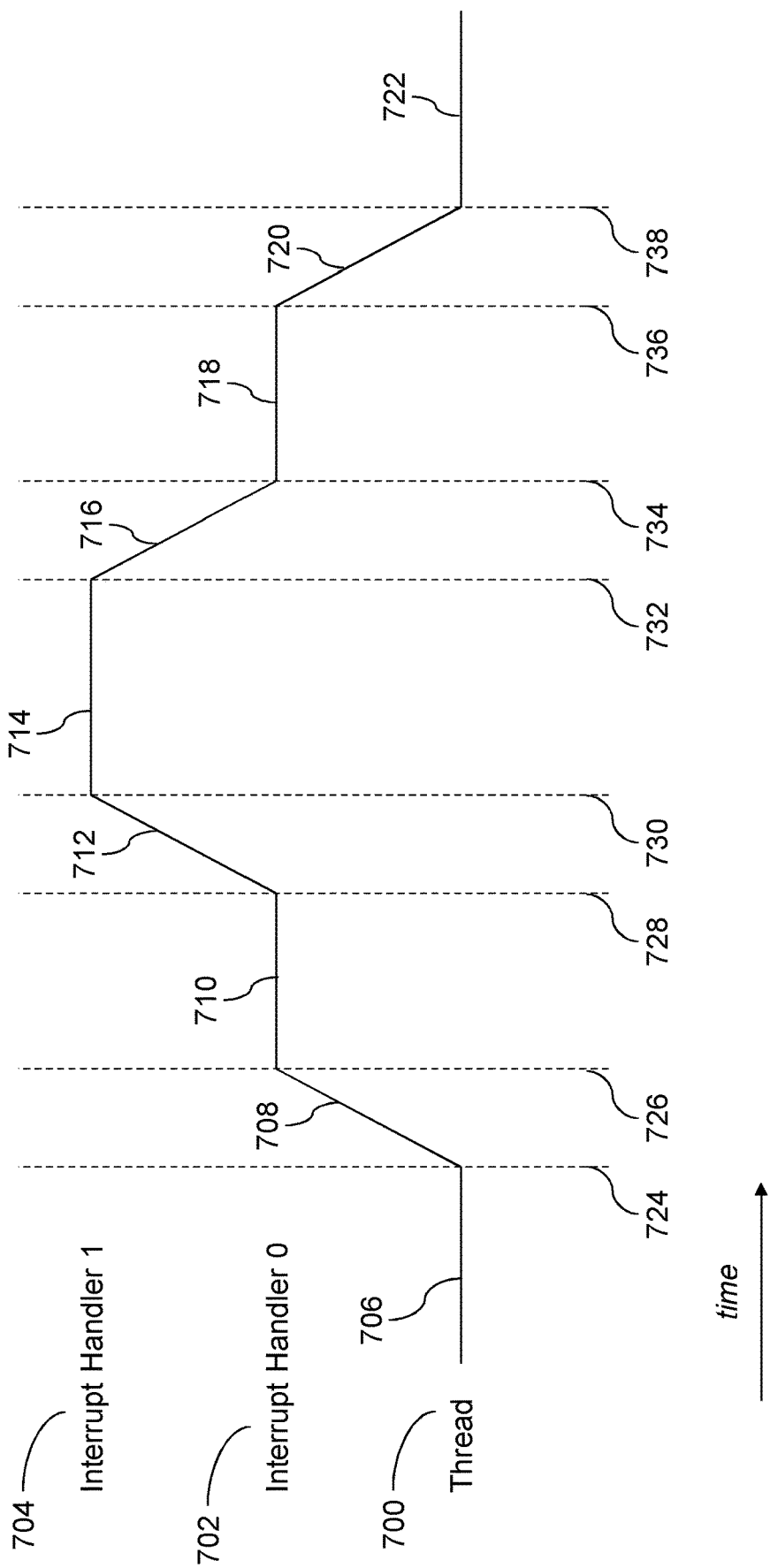
FIG. 13 is a time chart showing different stages as the SoC of FIG. 11 handles two interrupts with efficient memory usage.

FIG. 13 shows a schematic diagram illustrating the process by which the processor 600 handles the execution of a thread 700 being pre-empted (interrupted) by a first interrupt handler 702, which in turn is pre-empted by a second interrupt handler 704, with respect to time, embodying the present invention.

Figure 14:
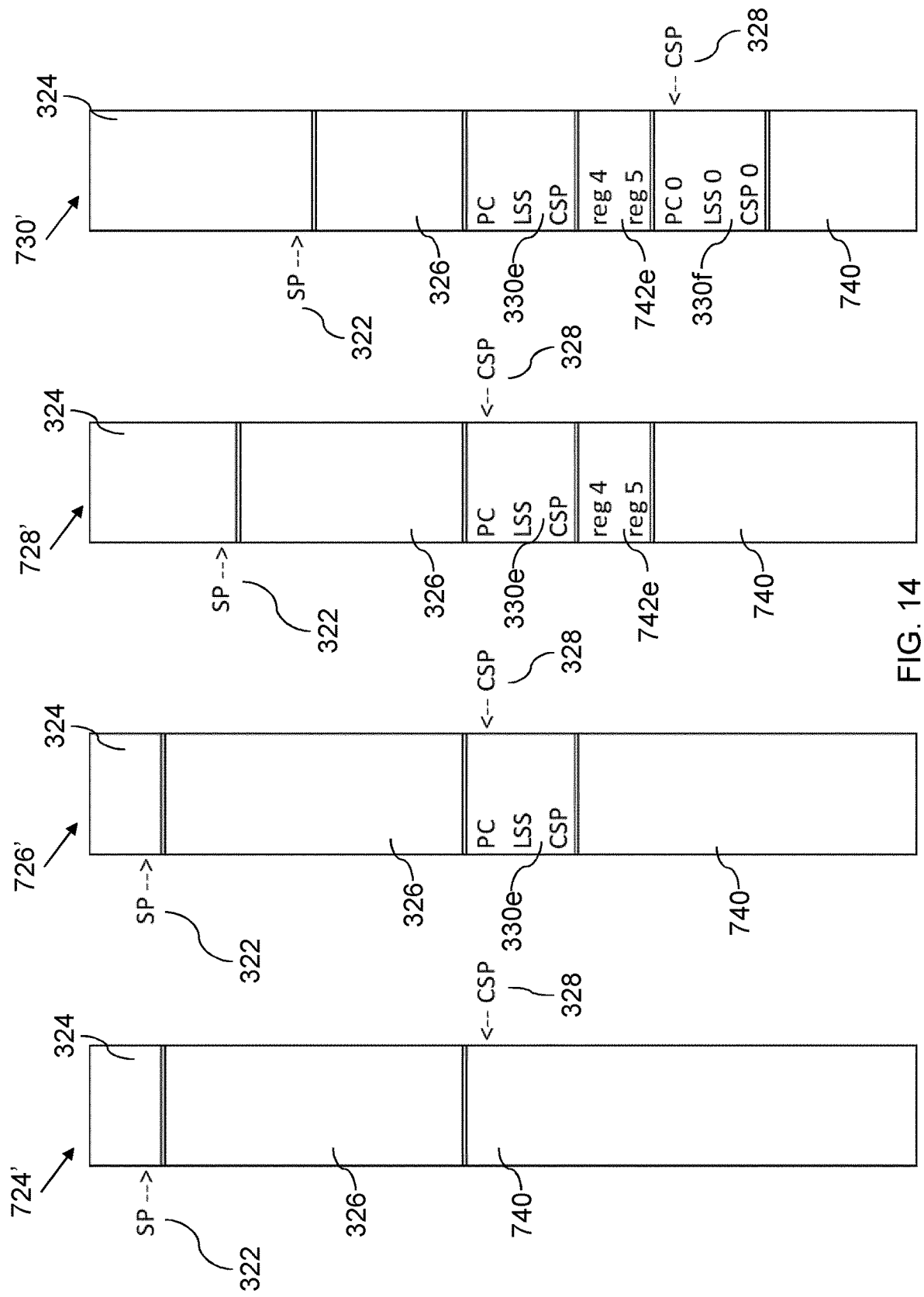
FIGS. 14 & 15 are schematic representations of the contents of the memory of the SoC of FIG. 11 at different stages of handling the interrupt requests with efficient memory usage.
Figure 15:
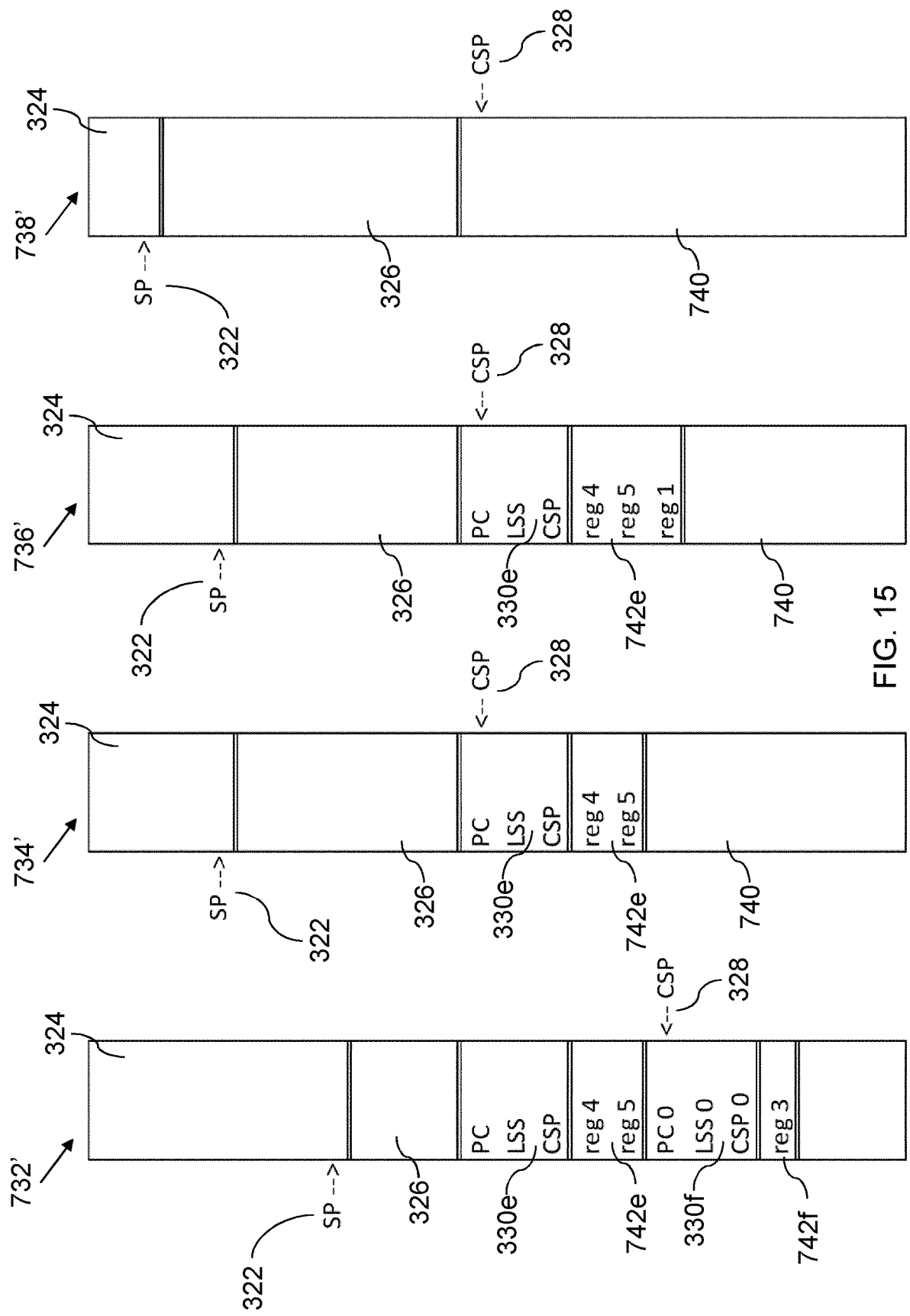

FIGS. 14 and 15, which should be viewed in conjunction with FIG. 13, show a number of schematic diagrams illustrating the state of a stack region of the memory 602 at various stages during execution of the thread 700, first interrupt handler 702 and second interrupt handler 704 by the processor 600.

Initially, at stage 706, the processor 600 executes the thread 700. At a time 724, the processor 600 receives a first interrupt request. Stack state 724' illustrates the stack region at time 724. Shown is the SP 322, above and including which is the used main stack space 324 and below which is the available main stack space 326. The size of the used main stack space 324 (and therefore the size of the available main stack space 326, and position of the SP 322) is not limited to that shown in stack state 724', but may be any value.

Also shown is the CSP 328, which points to a location designating a portion of the stack region dedicated to storing context data (hereafter referred to as the context stack). Below and including the CSP 328 is the available context stack space 740. The size of the portion of the stack region dedicated to storing context data is not limited to that shown in stack state 724', but may be any size. In some embodiments, the context stack data 330, 742 could be stored entirely separately from the main stack data 324, in different regions of memory.

When the first interrupt request is received at time 724, the processor 600 begins stage 708 where it transitions from executing the thread 700 to processing the interrupt request. In order to transfer execution from the thread 700 to the first interrupt handler 702, the processor 600 stores the PC, LSS and CSP associated with the thread 700 at the location designated by the CSP 328. The processor 600 then sets the status bits 630 to 'unsaved', and fetches the address of the interrupt handler associated with the receives interrupt request from a Interrupt Vector Table stored in memory 602, and stores it in the PC register.

At time 726, the processor 600 begins execution of the first interrupt handler 702. Stack state 726' illustrates the stack region at time 726. It can be seen from stack state 726' that the PC, LSS and CSP (link entries 330e) associated with the thread 700 have been stored in the context stack, and thus the size of the available context stack space 740 has been decreased accordingly.

During stage 710, the processor 600 executes the first interrupt handler 702. During that time, the processor 600 updates the values stored in two of the caller-saved registers 614. When each of these updates occur, the processor 600 simultaneously stores the previous values held in each of the registers at the next available location in the context stack. In some examples, the processor 600 may determine the next available location by counting the number of 'saved' flags, or by incrementing the CSP with each additional entry. When this occurs, the processor 600 updates the status bits 630 associated with the registers to 'saved' (1'b), and updates the associated position bits 632 to indicate the location within the context stack at which the previous value is stored. For example, if the previous register value is stored at the first available location in the context stack, adjacent to the link values 330*e*, then the value in the associated position bits for that register 632 is updated to indicate position zero (i.e. 000'*b* in binary).

At time 728, the processor 600 receives a second interrupt request. Stack state 728' illustrates the stack region at time 728. It can be seen from stack state 728' that, during stage 710, the processor 600 stored the register entries 742*e* held in caller-saved registers four and five in the context stack, with register four being stored before register five, and the available context stack space 740 has been decreased accordingly. Thus, the values stored in corresponding position bit portion $p_4$ and $p_5$ have been updated to zero (000'b) and one (001'b) respectively, and the corresponding status bits $b_4$ and $b_5$ have been updated to 'saved' (1'b). An additional portion of used main stack space 324 has been pushed to the main stack during execution of the first interrupt handler 702, with the SP 322 being adjusted accordingly, thereby reducing the amount of available main stack space 326.

The second interrupt request received by the processor 600 at time 728 is of higher priority than the first interrupt, and therefore the processor 600 transitions from execution of the first interrupt handler 702 to the second interrupt handler 704, at stage 712. In order to transfer execution from the first interrupt handler 702 to the second interrupt handler 704, the processor 600 firstly updates the position of the CSP 328 to the next available location within the context stack. The processor 600 then stores the PC, LSS and CSP associated with the first interrupt handler 702 at the location designated by the CSP 328. The processor 600 then sets the status bits 630 to 'unsaved'=0'b. The processor 600 then fetches the address of the interrupt handler associated with the second interrupt request from an Interrupt Vector Table stored in memory 602, and holds it in the PC register.

Stack state 730' illustrates the stack region at time 730, when the processor 600 has successfully transferred execution from the first interrupt handler 702 to the second interrupt handler 704. It can be seen from stack state 730' that the PC, LSS and CSP (link entries 330*f* associated with the first interrupt handler 702 have been stored in the context stack, and the size of the available context stack space 740 has been decreased accordingly.

The processor 600 then executes the second interrupt handler 704 at stage 714. During that time, the processor 600 updates the values stored in one of the caller-saved registers 614. When this update occurs, the processor 600 simultaneously stores the previous value held in the register at the next available location in the context stack. When this occurs, the processor 600 updates the status bit 630 associated with the register to 'saved' (1'b), and updates the associated position bits 632 to indicate the location within the context stack at which the previous value is stored. For example, if the previous register value is stored at the first available location in the context stack, adjacent to the link values 330*f*, then the value in the associated position bits for that register 632 is updated to indicate position zero (i.e. 000'b in binary).

At time 732, the processor 600 ceases execution of the second interrupt handler 704, and begins transferring execution back to the first interrupt handler 702. Stack state 732' illustrates the stack region at time 732. It can be seen from stack state 732' that, during stage 714, the processor 600 stored the register entry 742*f* held in caller-saved register three in the context stack, and the available context stack space 740 has been decreased accordingly. Thus, the value stored in corresponding position bit portion $p_3$ has been updated to zero (000'b), and the corresponding status bit has been updated to 'saved' (1'b). An additional portion of used stack space 324 has been pushed to the main stack during execution of the first interrupt handler 702, with the SP 322 being adjusted accordingly, thereby reducing the amount of available main stack space 326.

It can be seen from stack state 732' that by incorporating the position bits 632 and maintaining a context stack independently from the main stack, the number of entries required to store context data is reduced, as no stack entries are required to be reserved (and therefore wasted). Instead, the context data leaves no stack entries unoccupied, and thus memory usage is further optimised.

During stage 716, the processor 600 restores the context data associated with the second interrupt handler 704 in the context stack to the caller-saved registers 614 in order to resume execution of the first interrupt handler 702. In order to do this, the processor 600 uses the status bits 630 within the LSS register 626 to determine which register values have been pushed to the context stack by the processor 600 and therefore need to be restored. The processor 600 uses the position bits 632 within the LSS register 626 to determine the address at which the respective register value for each caller-saved register has been stored, by adding a corresponding offset to the current CSP address value. In this case, register three is at position zero (000'b). The processor 600 therefore restores the pushed register value 742*f* to caller-saved register three, before restoring the link entries 330*f* (PC, LSS and CSP) for the first interrupt handler 702 and frees the space occupied by the context data for the second interrupt handler 704. Additionally, the processor 600 frees the normal stack data associated with the second interrupt handler 704 from the main stack and adjusts the SP 322 accordingly, reducing the size of the used main stack space 324 and increasing the size of the available main stack space 326.

Once the context data for the second interrupt handler 704 has been restored to the caller-saved registers 614, the processor 600 resumes execution of the first interrupt handler 702 at time 734. Stack state 734' illustrates the stack region at time 734. It can be seen that the stack state 734' is identical to the stack state 728', illustrating that the processor 600 resumes executing the first interrupt handler 702 at the same point that it paused execution of the first interrupt handler 702 (at time 728) to begin execution of the second interrupt handler 704. The context data that was pushed to the context stack in order to execute the second interrupt handler 704 has been popped from the context stack. The processor 600 then continues execution of the first interrupt handler 702 at stage 718.

At time 736, the processor 600 ceases execution of the first interrupt handler 702, and begins transferring execution back to the thread 700. Stack state 736' illustrates the stack region at time 736. It can be seen from stack state 736' that, during stage 718, the processor 600 stored another register entry 742e held in caller-saved register one in the context stack (with a position value of two), and the available context stack space 740 has been decreased accordingly. Thus, the value stored in corresponding position bit portion $p_1$ has been updated to two (010'b), and the corresponding status bit $b_1$ has been updated to 'saved' (1'b).

During stage 720, the processor 600 restores the context data associated with the thread 700 in the context stack to the caller-saved registers 614 in order to resume execution of the thread 700. In order to do this, the processor 600 uses the status bits 630 within the LSS register 626 to determine which register values have been pushed to the context stack by the processor 600 and therefore need to be restored. The processor 600 uses the position bits 632 within the LSS register 626 to determine the location at which the register values for each register have been stored (in this case positions zero (000'b), one (001'b) and two (010'b) for registers four, five and one respectively). The processor 600 therefore restores the pushed register values 742e to caller-saved registers four, five and three, before restoring the link entries 330e (PC, LSS and CSP) for the thread 700 and freeing the space occupied by the context data for the first interrupt handler 702 from the context stack. Additionally, the processor 600 frees the normal stack data associated with the first interrupt handler 702 from the main stack and adjusts the SP 322 accordingly, reducing the size of the used main stack space 324 and increasing the size of the available main stack space 326.

Once the context data for the first interrupt handler 702 has been restored to the caller-saved registers 614, the processor 600 resumes execution of the thread 700 at time 738. Stack state 738' illustrates the stack at time 738. It can be seen that the stack state 738' is identical to the stack state 724', illustrating that the processor 600 resumes executing the thread 700 at the same point that it paused execution of the thread 700 (at time 724) to begin execution of the first interrupt handler 702. The context data that was pushed to the context stack in order to execute the first interrupt handler 702 has been cleared from the context stack. The processor 600 then continues execution of the thread 700 at stage 722.

Although the hardware-based interrupt handling processes disclosed herein are particularly useful when handling hardware interrupts (e.g. generated by a peripheral, such as a radio transceiver), they may also be used, in some embodiments, when handling software interrupts (i.e. interrupts generated by the execution of a special software instruction, such as the SVC instruction on Arm™ processors), or even when invoking routine function calls. Doing so may reduce the amount of instructions needed to be fetched and executed by the processor.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A processing apparatus comprising a processor, wherein:
the processor comprises a plurality of deferred-push processor registers;
the processor comprises processor-register control circuitry;
the processor-register control circuitry comprises a plurality of status registers, each status register corresponding to a different respective deferred-push register;
the processor-register control circuitry is configured to detect a write of a new value to a register of the deferred-push registers;
the processor-register control circuitry is configured, in response to said detection, to determine whether the status register for the deferred-push register has a first value, indicative of an unsaved status for the deferred-push register; and
the processor-register control circuitry is configured, when the status register is determined to have the first value, to: read a current value from the deferred-push register before the writing of the new value to the deferred-push register completes; write the current value to a memory; and set the status register for the deferred-push register to a second value, indicative of a saved status for the deferred-push register.

2. The processing apparatus of claim 1, comprising said memory to which the processor-register control circuitry is configured to write the current value of the deferred-push register.

3. The processing apparatus of claim 1, wherein the processor comprises one or more hardware interrupt inputs for receiving hardware interrupt request, and wherein the processor-register control circuitry is configured to set each of the plurality of status registers to the first value in response to the processor receiving a hardware interrupt request.

4. The processing apparatus of claim 1, comprising memory storing an interrupt vector table and storing software comprising one or more interrupt handlers, each stored at a respective address identified in the interrupt vector table, and wherein the processor is configured to perform a context switch and to branch to one of the interrupt handlers in response to receiving a hardware interrupt request.

5. The processing apparatus of claim 1, wherein the processor comprises a stack pointer register and a further processor register, and is configured to use a stack pointer, stored in the stack pointer register, to determine a memory address to which to push a value of the further processor register.

6. The processing apparatus of claim 5, wherein the processor-register control circuitry comprises a context stack pointer register, and is configured to use a context stack pointer value, stored in the context stack pointer register, to determine a memory address to which to write said current value of the deferred-push register.

7. The processing apparatus of claim 6, wherein the processor is configured to change the stack pointer, in response to receiving a hardware interrupt request, by an amount corresponding to a portion of memory at least large enough to hold the values of all of the plurality of deferred-push registers and of the context stack pointer register.

8. The processing apparatus of claim 6, wherein the processor-register control circuitry is configured, in response to receiving a hardware interrupt request, to push one or more of a program counter, the status registers and the context stack pointer, to addresses in the memory determined by the stack pointer.

9. The processing apparatus of claim 6, wherein the processor-register control circuitry is configured to copy a value from the stack pointer register to the context stack pointer register.

10. The processing apparatus of claim 6, wherein the processor-register control circuitry is configured to determine an address to which to push a value of a deferred-push processor register by applying a constant offset to a value in the context stack pointer register, wherein each of the deferred-push registers is associated with a different respective constant offset.

11. The processing apparatus of claim 6, wherein the processor-register control circuitry is configured to use the context stack pointer register to push deferred-push registers to consecutive memory addresses within a context stack structure in the memory, by pushing each deferred-push register to the next unoccupied address in the memory after the context stack pointer.

12. The processing apparatus of claim 11, wherein the processor-register control circuitry comprises a plurality of multi-bit position registers, each multi-bit position register corresponding to a different respective deferred-push register, and wherein the processor-register control circuitry is configured, when pushing a deferred-push register to an address in the memory, to store a value in the corresponding position register that encodes said address relative to a value of the context stack pointer register.

13. The processing apparatus of claim 11, wherein the processor-register control circuitry is configured, in response to receiving a hardware interrupt request, to push one or more of a program counter, the status registers and the context stack pointer, to addresses in the memory determined by a context-stack-pointer value stored in the context stack pointer register.

14. The processing apparatus of claim 1, wherein the processor is configured to perform context switches, and, when performing a context switch to a new context, to delay pushing a respective value stored in each deferred-push register to the memory until the respective deferred-push register is written to from within the new context.

15. The processing apparatus of claim 1, wherein the processor-register control circuit is configured, in response to detecting a return from an interrupt handler routine, to determine whether each status register corresponding to the plurality of deferred-push registers holds the second value and, when a status register holds the second value, to read a pushed value for the corresponding deferred-push register from the memory and write the pushed value to the deferred-push register.

16. The processing apparatus of claim 1, wherein the processing apparatus supports nested interrupts.

17. The processing apparatus of claim 1, wherein the processor-register control circuitry is configured to support tail-chained interrupt processing, wherein two or more interrupts are handled in succession without returning to a process that was executing when the first interrupt request was received between handling the successive interrupts.

18. The processing apparatus of claim 1, wherein the processor is configured not to pop any pushed status register values when returning from a first interrupt handler when a second interrupt is pending.

19. The processing apparatus of claim 1, wherein the status registers comprise respective binary flags within a multi-bit status register.

20. A method of operating a processing apparatus, wherein:
   the processing apparatus comprises a processor;
   the processor comprises a plurality of deferred-push processor registers; and
   the processor comprises a plurality of status registers, each status register corresponding to a different respective deferred-push register,
the method comprising:
   detecting a write of a new value to a register of the deferred-push registers;
   in response to said detecting, determining that the status register for the deferred-push register has a first value, indicative of an unsaved status for the deferred-push register;
   in response to said determining, reading a current value from the deferred-push register before the writing of the new value to the deferred-push register completes;
   writing the current value to a memory; and
   setting the status register for the deferred-push register to a second value, indicative of a saved status for the deferred-push register.

* * * * *